United States Patent [19]

Hirata et al.

[11] Patent Number: 4,820,795

[45] Date of Patent: Apr. 11, 1989

[54] POLYESTER VESSEL AND PACKAGE

[75] Inventors: Sadao Hirata, Kamakura; Yoshihiko Watanabe, Yokohama, both of Japan

[73] Assignee: Toyo Seikan Kaisha, Ltd., Tokyo, Japan

[21] Appl. No.: 128,948

[22] Filed: Dec. 4, 1987

[30] Foreign Application Priority Data

Dec. 5, 1986 [JP] Japan .................................. 61-288706

[51] Int. Cl.$^4$ .............................................. C08G 63/02
[52] U.S. Cl. .................................... 528/272; 528/274; 528/285; 528/308.3; 426/106; 426/113; 426/118
[58] Field of Search ............ 528/272, 274, 285, 308.3; 426/106, 113, 118

[56] References Cited

U.S. PATENT DOCUMENTS

| | | | |
|---|---|---|---|
| 4,263,425 | 4/1981 | Rothe et al. ...................... | 528/308.1 |
| 4,340,721 | 7/1982 | Bonnebat et al. ................... | 528/272 |
| 4,609,721 | 9/1986 | Kirshenbaum et al. ............. | 528/285 |

Primary Examiner—Morton Foelak
Assistant Examiner—S. A. Acquah
Attorney, Agent, or Firm—Sherman & Shalloway

[57] ABSTRACT

Disclosed is a polyester vessel having mouth, side wall and bottom portions formed of a polyester composed mainly of ethylene terephthalate units, wherein the thermoplastic polyester is a polyester containing a catalyst residue in an amount smaller than 1000 ppm as the metal, and in the thermoplastic polyester constituting the bottom portion of the vessel, the ratio of the thermal crystallization degree represented by the following formula:

$$100 \times (Q_{DC} - Q_{AC})/Q_{DC} \qquad (1)$$

wherein $Q_{AC}$ stands for the heat quantity of crystallization at elevation of the temperature and $Q_{DC}$ stands for the heat quantity of crystallization at lowering of the temperature, is lower than 90%.

10 Claims, 6 Drawing Sheets

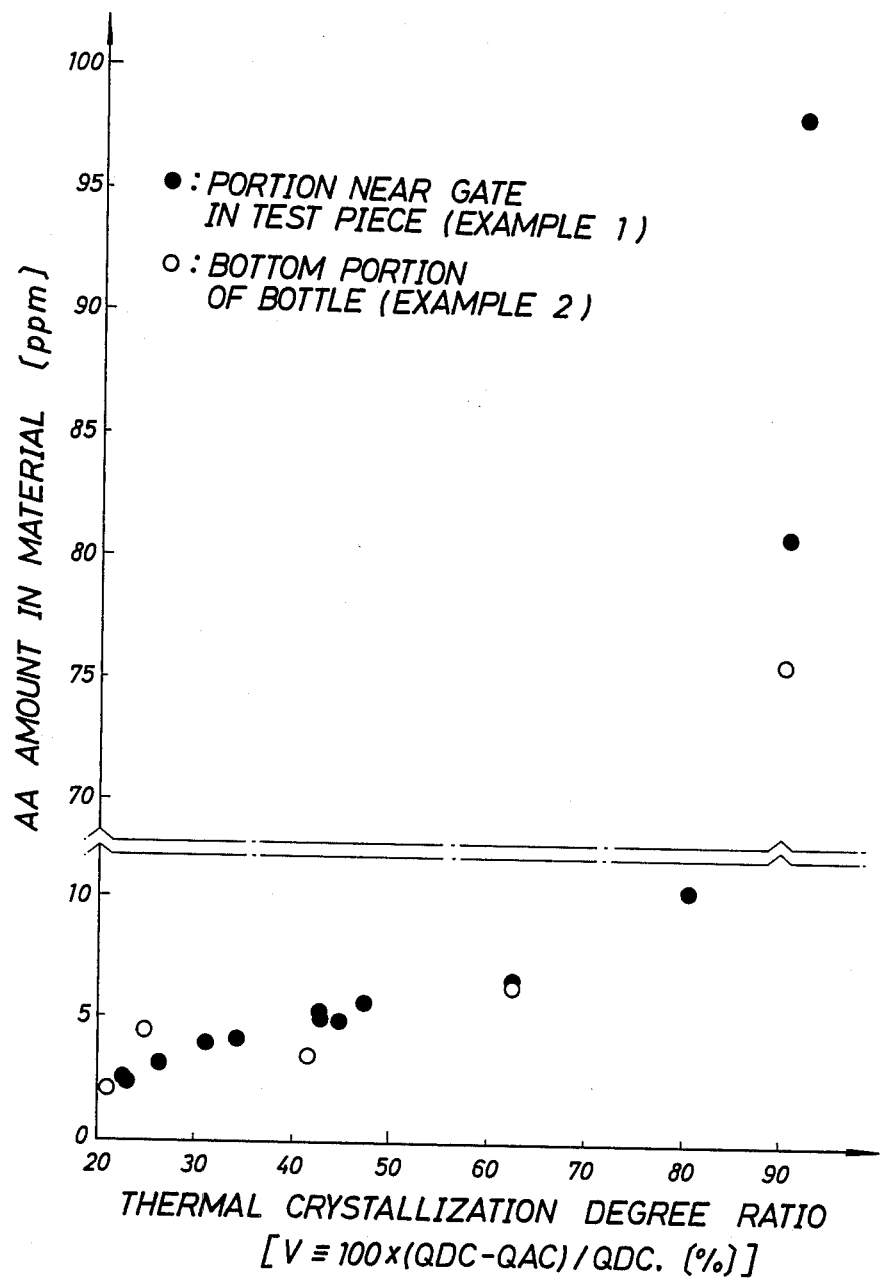

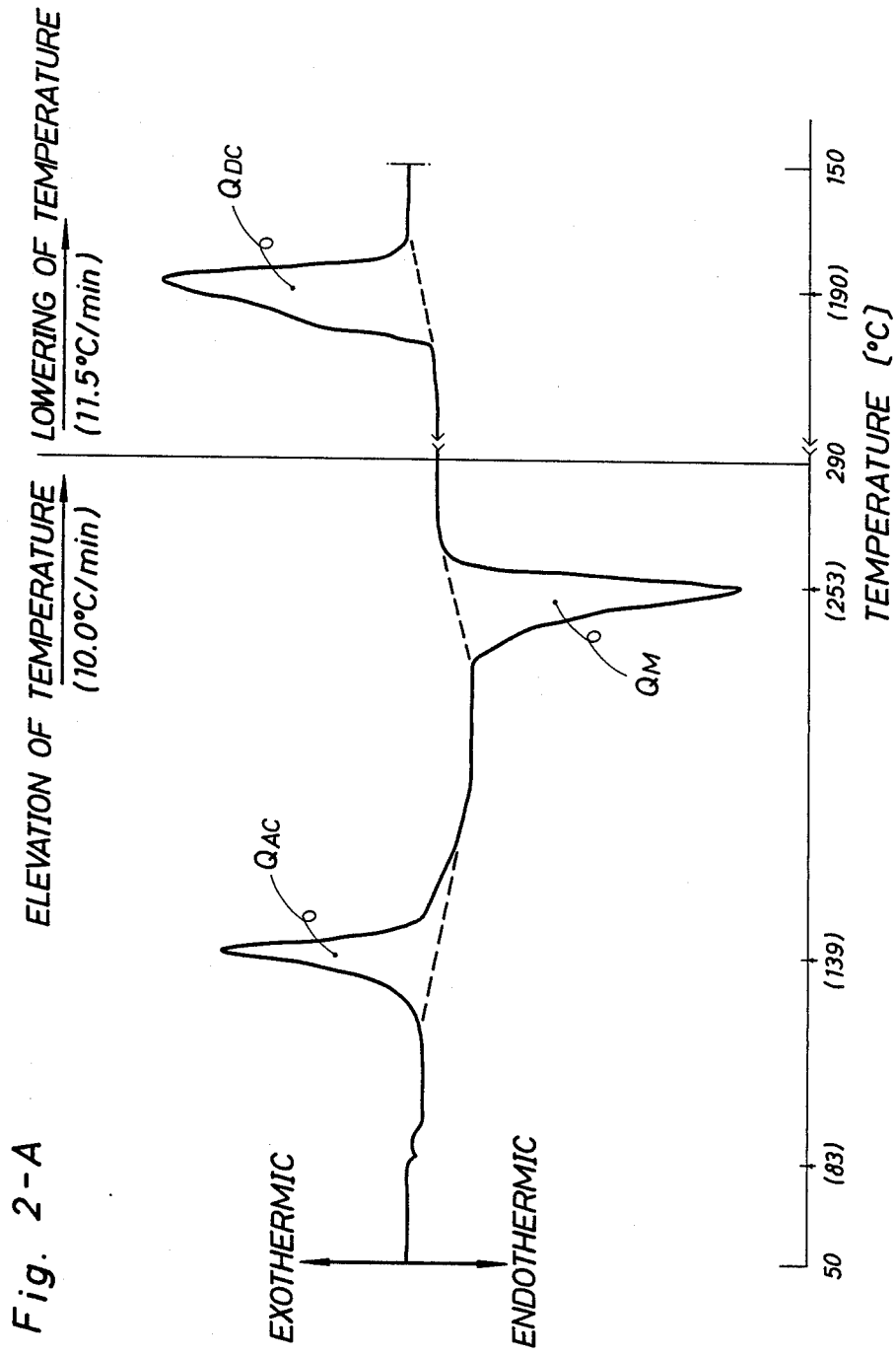
Fig. 2-A

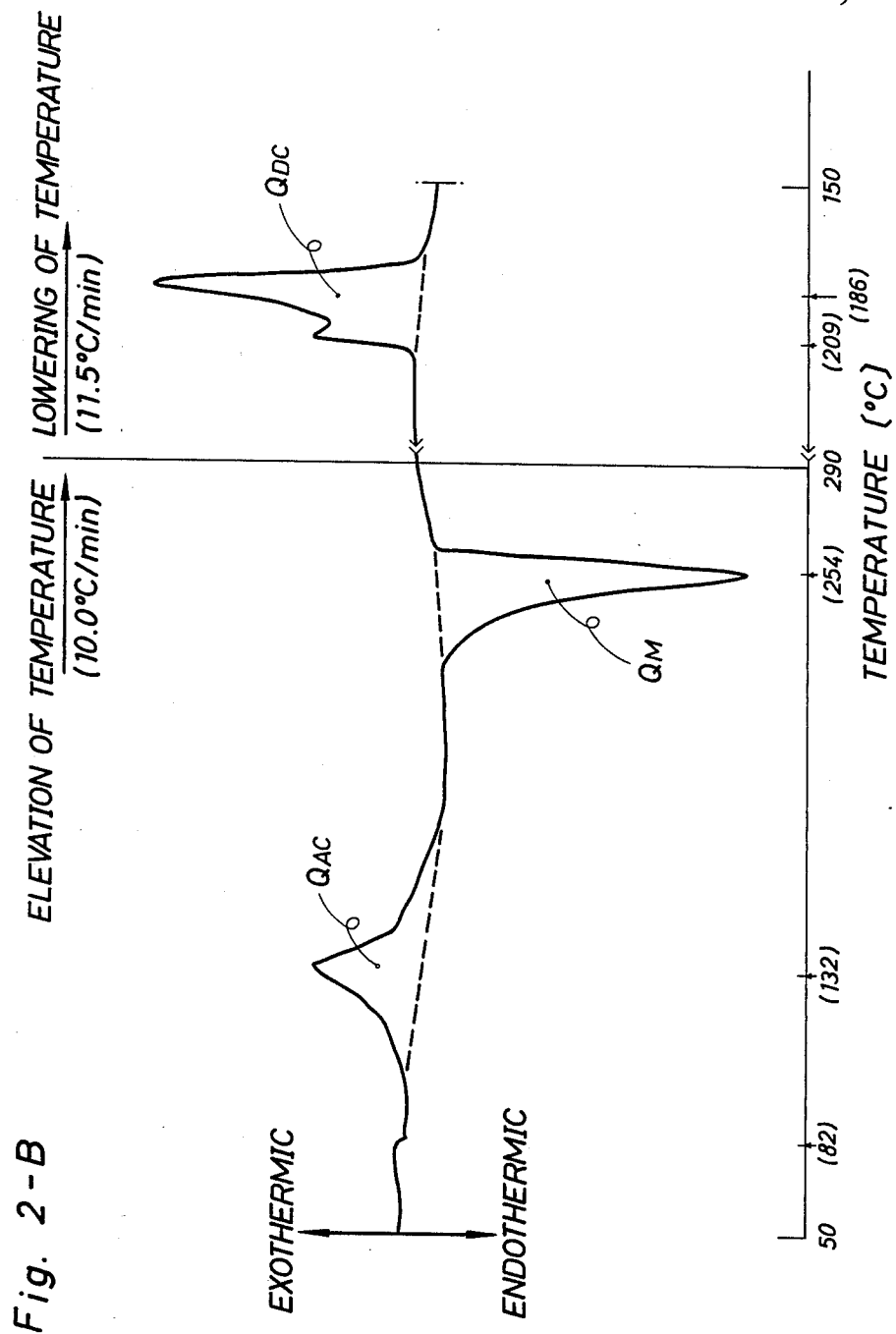
Fig. 2-B

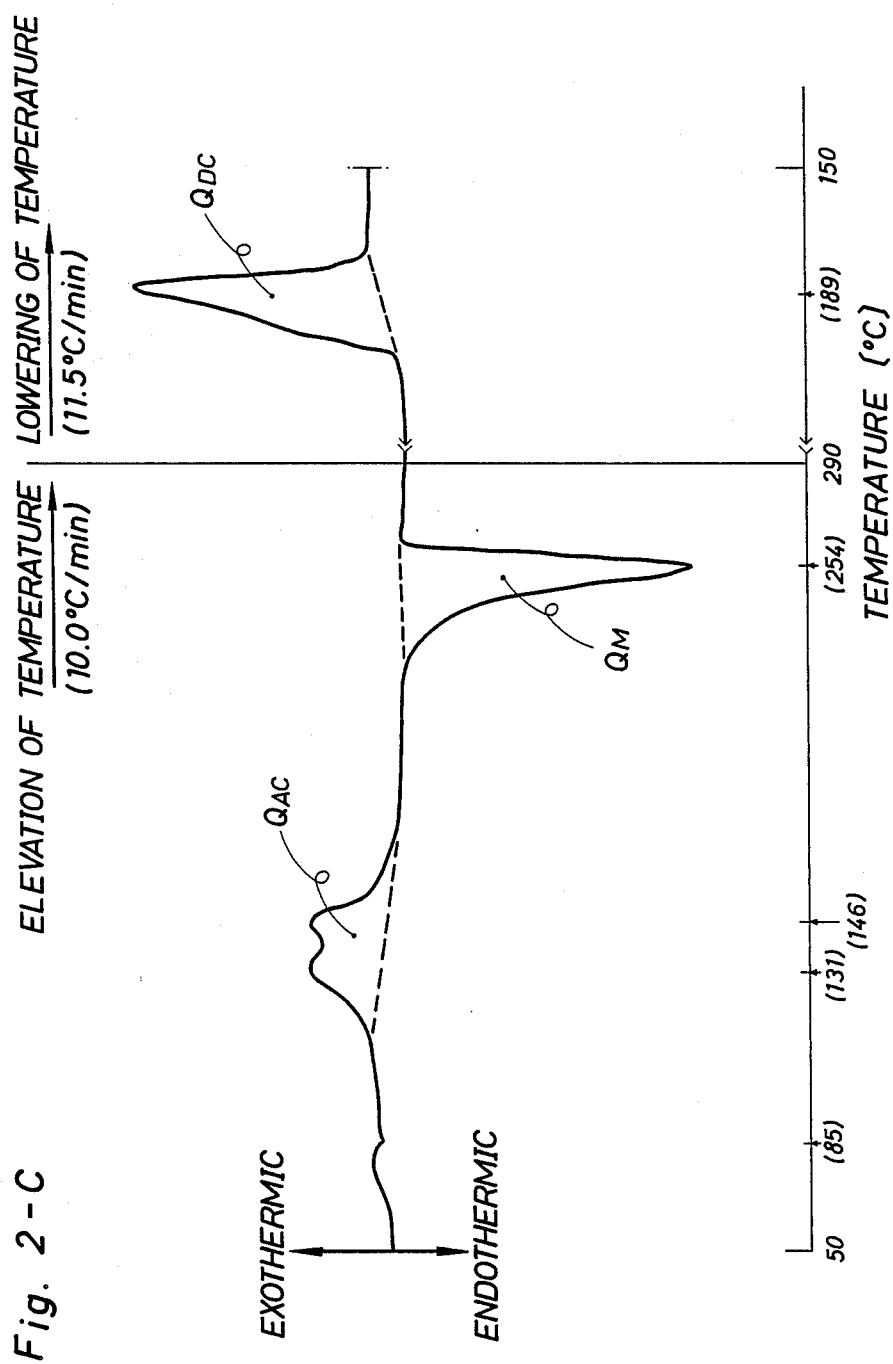
Fig. 2-C

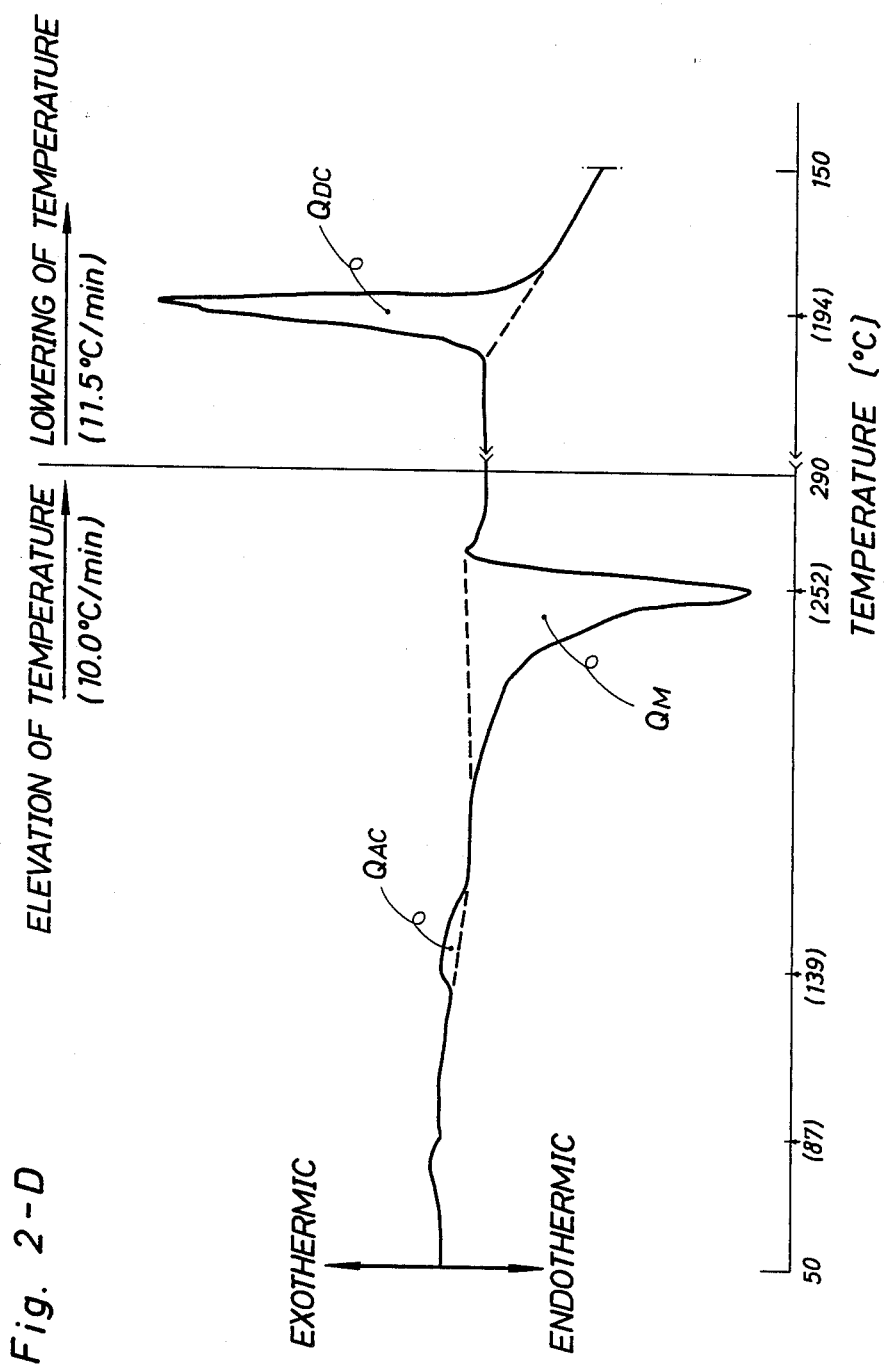
Fig. 2-D

POLYESTER VESSEL AND PACKAGE

BACKGROUND OF THE INVENTION

(1) Field of the Invention

The present invention relates to a polyester vessel and a package comprising the same. More particularly, the present invention relates to a polyethylene terephthalate vessel which has a good flavor-retaining property to a content and is excellent in the impact strength of the bottom portion, the resistance to environmental stress cracking and the resistance to the shrinkage with the lapse of time (post shrinkage), and a packaging comprising the same.

(2) Description of the Related Art

A biaxially draw-blow-formed polyethylene terephthalate vessel is excellent in pressure resistance, rigidity, transparency and impact resistance and has a relatively low permeability to gases such as oxygen and carbon dioxide gas, and therefore, this vessel is widely used for containing various liquid foods, seasonings, cosmetics and the like. Moreover, a plastic can formed by wrap-seaming an opening of a polyethylene terephthalate vessel barrel with a metal lid is now being put into practical use.

However, at the step of heat forming of polyethylene terephthalate, acetaldehyde is generated by thermal decomposition, and acetaldehyde in the vessel wall migrates into the content to degrade the flavor of the content. This reduction of the flavor is especially conspicuous in a package formed by filling a content containing an edible oil in a vessel and sealing the vessel.

As the conventional means for reducing the concentration of acetaldehyde formed by the thermal decomposition in polyethylene terephthalate, there can be mentioned a method in which after ordinary polymerization, polyethylene terephthalate is further subjected to solid phase polymerization to decrease the contents of low-molecular-weigth components or increase the molecular weight of polyethylene terephthalate to some extend, a method in which the form temperature at the heat-forming step is reduced to a level as low as possible, and a method in which the shear stress at the heat-forming step is reduced to a level as low as possible.

In general, a vessel of a polyester such as polyethylene terephthalate is prepared by melting the polyester and injecting the melt into an injection mold or by once forming a substantially amorphous preform by the above-mentioned injection molding and draw-forming the preform at a draw-forming temperature. Increase of the molecular weight of the polyester tends to result in degradation of the injection moldability of the polyester, and reduction of the molding temperature results in increase of the load imposed on an injection machine. Moreover, reduction of the shear stress results in reduction of the molding speed and tends to cause inclusion of air bubbles.

SUMMARY OF THE INVENTION

It is therefore a primary object of the present invention to provide a polyester vessel in which the acetaldehyde concentration in the polyester vessel wall is reduced and the flavor-retaining property is improved without any particularly bad influences on the moldability and physical properties of the polyester.

We found that if a polyester containing a catalyst residue in an amount smaller than 1000 ppm as the metal is used as the thermoplastic polyester constituting the vessel and the thermal crystallization degree ratio of the thermoplastic polyester constituting the bottom of the vessel is controlled below a certain level, the aldehyde concentration in the vessel wall, especially the bottom portion of the vessel, can be prominently reduced, with the result that the flavor-retaining property can be improved. We have now completed the present invention based on this finding.

More specifically, in accordance with one fundamental aspect of the present invention, there is provided a polyester vessel having mouth, side wall and bottom portions formed of a polyester composed mainly of ethylene terephthalate units, wherein the thermoplastic polyester is a polyester containing a catalyst residue in an amount smaller than 1000 ppm as the metal, and in the thermoplastic polyester constituting the bottom portion of the vessel, the ratio of the thermal crystallization degree represented by the following formula:

$$100 \times (Q_{DC} - Q_{AC})/Q_{DC} \quad (1)$$

wherein $Q_{AC}$ stands for the heat quantity of crystallization at elevation of the temperature an $Q_{DC}$ stands for the heat quantity of crystallization at lowering of the temperature, is lower than 90%.

In accordance with another fundamental aspect of the present invention, there is provided a polyester package comprising a polyester vessel having mouth, side wall and bottom portions formed of a thermoplastic polyester composed mainly of ethylene terephthalate units and an edible oil-containing content filled and sealed in the polyester vessel, wherein the thermoplastic polyester is a polyester containing a catalyst residue in an amount smaller than 100 ppm as the metal, and in the thermoplastic polyester constituting the bottom portion of the vessel, the ratio of the thermal crystallization degree represented by the following formula:

$$100 \times (Q_{DC} - Q_{AC})/Q_{DC} \quad (1)$$

wherein $Q_{AC}$ stands for the heat quantity of crystallization at elevation of the temperature and $Q_{DC}$ stands for the heat quantity of crystallization at lowering of the temperature, is lower than 90%.

BRIEF DESCRIPTION OF THE DRAWINGS

FIG. 1 is a graph illustrating the relation between the thermal crystallization degree ratio (V) of the bottom portion of a molded polyester product and the acetaldehyde concentration of the bottom portion of the molded polyester product.

FIGS. 2-A, 2-B, 2-C and 2-D are differential thermal analysis curves of typical four polyesters by a differential calorimeter.

DETAILED DESCRIPTION OF THE PREFERRED EMBODIMENTS

Figure 3:
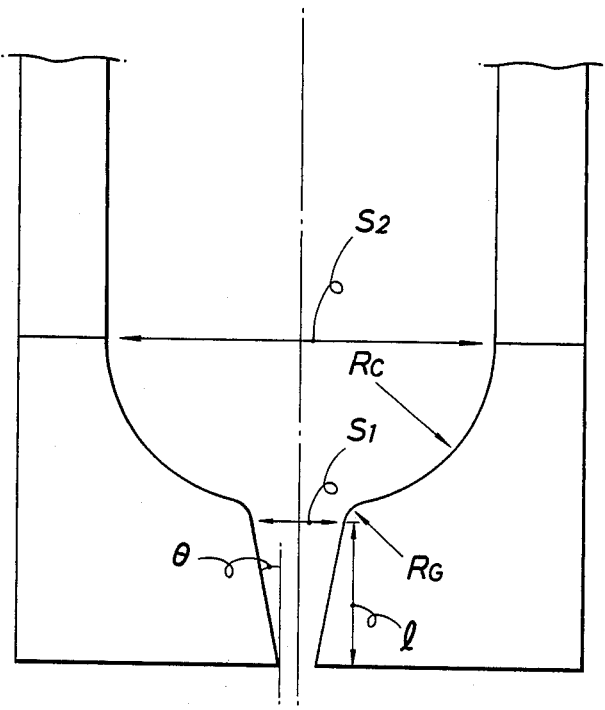
FIG. 3 is a diagram illustrating a shape and size of a mold used in injection molding of a preform for a polyester vessel.

It is said that formation of acetaldehyde by the thermal decomposition of polyethylene terephthalate is due to the decomposition of the terminal hydroxyl group of the polymer, represented by the following formula:

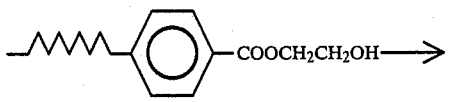 (2)

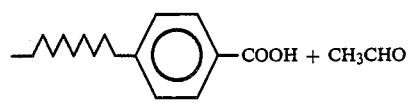

and to the decomposition of the main chain of the polymer represented by the following formula:

 (3)

The present invention is based on the novel finding that if the ratio (V) of the thermal crystallization degree of the thermoplastic polyester constituting the bottom portion of the vessel, which is defined by the above-mentioned formula (1), is smaller than 90%, preferably smaller than 85%, especially preferably smaller than 50%, the acetaldehyde concentration in the material of the bottom portion of the polyester vessel can be prominently reduced.

In FIG. 1 of the accompanying drawings, the measured values of the ratio (V) of the thermal crystallization degree of the bottom portion of the molded vessel are plotted on the abscissa and the measured values of the aldehyde concentration of the molded polyester vessel are plotted on the ordinate. From the results shown in FIG. 1, it is seen that the acetaldehyde concentration differs by more than one figure above and below the boundary where the ratio of the thermal crystallization degree is 90%, and that it is very critical for controlling the acetaldehyde concentration to a low level to control the ratio of the thermal crystallization degree below 90%.

In the instant specification and appended claims, the ratio of the thermal crystallization degree defined by the above-mentioned formula (1) is a characteristic value having a relation to the crystal structure of the polyester thermally determined by a differential calorimeter and is different from the crystallization degree determined by the density gradient tube method.

More specifically, the ratio of the thermal crystallization degree is determined in the following manner. The temperature of the polyester to be measured is elevated from room temperature at a substantially constant rate (10.0° C./min on the average), and the exothermic peak of crystallization at elevation of the temperature is measured. The temperature of the polyester is further elevated and the polyester is completely molten (an endothermic peak by melting of the crystal appears). Then, the temperature is lowered from this molten state at a substantially constant rate (11.5° C./min on the average) and the exothermic peak at lowering of the temperature is measured. The area of the exothermic peak of crystallization at elevation of the temperature corresponds to the heat quantity ($Q_{AC}$) of crystallization at elevation of the temperature and the area of the exothermic peak of crystallization at lowering of the temperature corresponds to the heat quantity ($Q_{DC}$) of crystallization at lowering of the temperature. The ratio (V) of the thermal crystallization degree is determined according to the following formula:

$$V = \frac{Q_{DC} - Q_{AC}}{Q_{DC}} \times 100 \quad (1')$$

FIGS. 2-A, 2-B, 20C and 2-D show differential thermal analysis curves of typical four polyesters, that is, a polyester having a low ratio of the thermal crystallization degree (FIG. 2-A), a polyester having a high ratio of the thermal crystallization degree (FIG. 2-D) and polyesters having a medium ratio of the thermal crystallization degree (FIGS. 2-B and 2-C), by a differential calorimeter. In the drawings, especially FIGS. 2-B and 2-C showing a medium ratio of the thermal crystallization degree, peculiar exothermic behaviors are observed at elevation of the temperature and at lowering of the temperature. In these curves, $Q_M$ indicates the endothermic peak by melting of the crystal.

The ratio (V) of the thermal crystallization degree determined according to the above-mentioned method has the following meanings. Namely, in the denominator of each of the formulae (1) and (1'), the heat quantity ($Q_{DC}$) of crystallization at lowering of the temperature has a relation to a maximum crystallization degree that can be taken by the polyester at elevation and lowering of the temperature since the polyester is gradually cooled from the molten state and passed through the crystallization temperature region (225° to 175° C. in case of polyethylene terephthalate). On the other hand, in the numerator of each of the formulae (1) and (1'), the heat quantity ($Q_{AC}$) has a relation to the cystallization degree of the polyester which is passed through the crystallization temperature region while being gradually heated, except the already crystallized portion. Accordingly, in the numerator of each of the formulae (1) and (1'), the value of $Q_{DC}-Q_{AC}$ indicates the crystallization degree inherently possessed by the polyester, and the normalized ratio (V) of the thermal crystallization degree can be determined from these values of the thermal crystallization degree.

THe reason why the acetaldehyde concentration in the bottom portion of the polyester is controlled to a very low level in the present invention by controlling the ratio (V) of the thermal crystallization degree of the polyester constituting the bottom portion of the vessel below 90%, preferably below 85%, especially preferably below 50%, has not been completely elucidated. If the simple aspect of the heat history of the polyester alone is taken into consideration, since the heat quantity received by the polyester at the cooling step (at the time of heat crystallization) is much smaller than the heat quantity received by the polyester at the heat-melt-molding step, it is hardly considered that the acetaldehyde concentration differs by one figure or more only for the reason that the ratio (V) of the thermal crystallization degree is about 90%. From the results shown in FIG. 1, it is presumed that temperatures at which acetaldehyde is left and accumulated in the polyester by decomposition of the polyester are within the crystallization temperature region of the polyester and this decomposition reaction includes a certain induction period. The reason why the bottom portion of the polyester vessel is especially taken into consideration in the present invention is that in the injection molding of a vessel or a preform for a vessel, a molten resin is ordinarily injected from the center of the bottom portion, and the bottom portion is maintained in the above-mentioned temperature region for a longest time.

In the present invention, in order to control the ratio (V) of the thermal crystallization degree in the polyester of the bottom portion within the above-mentioned range, it is indispensable that a polyester containing a catalyst residue described hereinafter in an amount smaller than 1000 ppm, especially smaller than 900 ppm, as the metal should be used as the polyester. In an industrially prepared polyester a residue of a catalyst used for the synthesis of the polyester, such as an ester exchange catalyst or a polycondensation catalyst, is inevitably contained. This catalyst residue acts as a nucleating agent or the like while the polyester is passed through the above-mentioned crystallization temperature region, and the catalyst residue increases the thermal crystallization speed and also increases the degree of the thermal crystallization. If the amount of the catalyst residue exceeds the range specified in the present invention, it is difficult to maintain the ratio (V) of the thermal crystallization degree of the polyester of the bottom portion within the range specified in the present invention under industrial injection molding conditions, and therefore it is indispensable that a polyester in which the amount of the catalyst residue is smaller than 1000 ppm (as the total metal amount) should be used as the vessel-forming polyester.

In the present invention, since the ratio (V) of the thermal crystallization degree of the polyester of the bottom portion of the vessel is maintained below 90%, especially below 85%, the acetaldehyde concentration in the polyester can be controlled below 30 ppm, especially below 15 ppm, and the flavor-retaining property to the content is improved, and simultaneously, the impact strength and environmental stress cracking resistance of the bottom portion of the vessel and the resistance of the vessel against the shrinkage with the lapse of time (post shrinkage resistance) are improved.

Polyester

The kind of the thermoplastic polyester has great influences on the ratio of the thermal crystallization degree of the bottom of the formed vessel. Namely, if the inherent viscosity (IV) of the polyester is increased, the crystallization speed is lowered. Diethylene glycol units are inevitably contained in a polyester composed mainly of ethylene terephthalate units, and if the content of diethylene glycol units is reduced, the crystallization speed is elevated. Moreover, as the amount of the comonomer component is increased in the thermoplastic polyester, the crystallization speed is lowered.

The composition and characteristics of the polyester have great influences not only on the crystallization speed but also on the moldability of the polyester and the mechanical strength and physical properties of the vessel. Namely, if the inherent viscosity of the polyester is increased, the shear stress is increased at the injection molding, which results in increase of the ratio of the thermal crystallization degree of the polyester. Furthermore, as the content of diethylene glycol units in the polyester is increased, the mechanical strength or gas barrier property of the polyester is degraded. The same holds good when the amount of the comonomer component in the polyester is increased.

In view of the foregoing, it is preferred that a polyester composed mainly of ethylene terephthalate units, which as an inherent viscosity (IV) of 0.55 to 1.40 dl/g, especially 0.65 to 1.25 dl/g, and a diethylene glycol unit content of 0.01 to 5.0% by weight, especially 0.05 to 3.5% by weight, be used.

Polyethylene terephthalate is most preferred. However, a copolyester can be used, so far as the essential properties of polyethylene terephthalate area not lost. For example, copolyesters containing dicarboxylic acid components such as isophthalic acid, p-β-hydroxyethoxybenzoic acid, naphthane-2,6-dicarboxylic acid, diphenoxyethane-4,4'-dicarboxylic acid, 5-sodium-sulfoisophthalic acid, adipic acid, sebacic acid and alkyl ester derivatives thereof, and glycol components such as propylene glycol, 1,4-butane-diol, neopentyl glycol, 1,6-hexylene glycol, cyclohexane dimethanol and an ethylene oxide adduct of disphenol A can be used.

The polyester used in the present invention should contain the catalyst residue in an amount below the above-mentioned limit. This polyester can be obtained by carrying out the polyester synthesis reaction by using a known ester exchange catalyst or polycondensation catalyst in such an amount that the amount of the residue is smaller than 1000 ppm, especially smaller than 900 ppm.

As specific examples of the catalyst, there can be mentioned germanium compounds, titanium compounds, antimonyl compounds, zinc compounds, cadmium compounds, manganese compounds, angensium compounds, cobalt compounds, silicon compounds, tin compounds, lead compounds, aluminum compounds, boron compounds, nitrogen compounds, phosphorus compounds and other compounds, such as disclosed in Kanetoshi Kondo and Michiko Fukaya, "Petroleum and Petrochemistry", 19(7), 93 (1075), 19(8), 92 (1975), 19(10), 94 (1975), 19(11), 92 (1975), 20(1), 66 (1976), 20(2), 48 (1976), 20(3), 54 (1976), 20(4), 51 (1976), 20(5), 58 (1976), 20(6), 50 (1976) and 20(7), 56 (1976), and Japanese Patent Application Laid-Open Specification No. 20291/72. Of these catalysts, for polyester vessel, there are preferably used germanium compounds such as germanium dioxide, antimony compounds such as antimony trioxide, cobalt compounds such as cobalt acetate, titanium compounds such as titanium tetrachloride, zinc compounds such as zinc acetate, manganese compounds such as manganese acetate and silicon compounds such as methyl silicate and other organic silicates, and phosphoric acid and other phosphorus compounds are especially preferred.

A phosphoric acid type stabilizer such as orthophosphoric acid, metaphosphoric acid, pyrophosphoric acid, tripolyphosphoric acid, phosphorous acid or hypophosphorous acid has been conventionally added at the step of polycondensation of polyethylene terephthalate for preventing yellowing and attaining other objects. As the stabilizer that can be used in the present invention, there can be mentioned phosphoric acid; aliphatic organic carboxylic acid salts of Zn, Mn, Mg and Ca; bismuth phosphate; monoammonium phosphate, diammonium phosphate and monammonium phosphorite; salts of phosphoric acid esters having at least one free alcoholic hydroxyl group, such as sodium β-glycerophosphate and calcium β-glycerophosphate; phosphotungstic acid, ammonium phosphotungstate and sodium phosphotungstate; tertiary phosphines having a boiling point higher than 150° C. and represented by the general formula

in which $R_1$, $R_2$ and $R_3$ stand for an alkyl group having 1 to 8 carbon atoms, a phenyl group, a benzyl group or a tolyl group, such as tripropylphosphine, triphenylphosphine and ethylphenyltolylphosphine; quaternary phosphonium compounds such as triphenylmethylphosphonium iodide and triphenylbenzylphosphonium chloride; and quaternary phosphonium compounds represented by the general formula

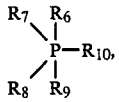

in which $R_6$, $R_7$, $R_8$ and $R_9$ stand for an alkyl, aryl or aralkyl group and $R_{10}$ stands for a hydrogen atom or an alkyl, aryl or aralkyl group, such as triphenylbenzylphosphonium ethylene glycoxide and triphenylmethylphosphonium methoxide.

As is apparent from the examples given hereinafter, from the viewpoint of reduction of the acetaldehyde concentration in the vessel wall, it is preferred that the polyester used in the present invention be a polyester containing a phosphoric acid type stabilizer as mentioned above. More specifically, from the examples given hereinafter, it will be readily understood that if the phosphoric acid type stabilizer is incorporated in an amount larger than 15 ppm as P in case of the Ge type catalyst, in an amount larger than 55 ppm as P in case of the Ti type catalyst or in an amount larger than 95 ppm as P in case of the Sb type catalyst, especially in an amount larger than 100 ppm as P, the effect of reducing the acetaldehyde concentration is enhanced in case of any catalyst. The upper limit of the amount of the phosphoric acid type stabilizer is known, and it is generally preferred that the amount of the phosphoric acid type stabilizer be smaller than 500 ppm, especially smaller than 200 ppm as P.

Vessel and Forming Method

The polyester vessel of the present invention is prepared according to a known vessel-forming method except that the ratio (V) of the thermal crystallization degree of the polyester of the bottom portion is controlled below 90% at the heat forming of the vessel.

The present invention is advantageously applied to a biaxially drawn polyester vessel prepared according to a method in which a bottomed preform of a polyester is formed by injection molding of the polyester and the bottomed preform is stretched and drawn in the axial direction while the preform is expanded and drawn in the circumferential direction by blowing a gas into the preform. In injection molding of a polyester, a gate is arranged at the center of the bottom portion and the amount of the molten resin passing through the bottom portion is largest, as pointed to hereinbefore, and a large shearing force acts on the gate and generation of heat is large in this portion. Therefore, quenching of the bottom portion is difficult and the time for passage through the crystallization temperature region at the molding is longest in bottom portion.

At least one of the following means can be adopted for maintaining the ratio (V) of the thermal crystallization degree in the bottom portion of a biaxially drawn polyester vessel within the range specified in the present invention.

(1) In the case where the temperature of the injected resin is high, a long time is required for a long time and the time for passage through the crystallization temperature regin is prolonged. Therefore, the temperature is lowered. If the resin temperature is lowered, the shear stress at the molding is increased. An optimum value is present for the resin temperature, and it is preferred that the resin temperature be 260° to 350° C., especially 270° to 330° C.

(2) If the temperature of the injection mold, especially the temperature of the bottom portion of the mold, is lowered, the time for passage through the crystallization temperature region is short. Accordingly, the temperature of the mold is lowered to a level as low as possible. Also in this case, however, if the mold temperature is too low, the shear stress is increased. Therefore, it is preferred that the temperature of the mold, especially the temperature of the bottom portion of the mold, be 1° to 175° C., especially 3° to 170° C.

(3) The material of the injection mold is important. Use of a mold having a high heat conductivity and a small surface roughness is effective for maintaining the ratio (V) of the thermal crystallization degree within the above-mentioned range.

Accordingly, a mold of a beryllium-copper alloy, which is surface-finished so that the maximum height roughness (Rmax, JIS B-0601) is smaller than 3.2 m, especially smaller than 0.8 m, is used.

Design of the mold, especially the cavity portion near the gate of the injection zone (occasionally referred to as "cavity B portion" hereinafter), has very important influences. Preferred shape and dimensions of the mold will now be described with reference to FIG. 3.

(4) In order to avoid or moderate generation of heat by the shear stress of the resin stream in the bottom portion of the preform or the portion adjacent thereto, the land length l of the gate is increased. It is preferred that the land length l of the gate be 2 to 50 mm, especially 5 to 30 mm.

(5) For the same purpose as described in (4) above, the sectional area $S_1$ of the opening on the side of the bottom portion (cavity) of the gate is increased as much as possible. It is preferred that the sectional area $S_1$ be set so that the ratio $S_1/S_2$ of the sectional area $S_1$ of the opening to the sectional area $S_2$ of the cavity is in the range of from 0.010 to 0.050, especially from 0.015 to 0.040.

(6) For the same purpose as described in (4) above, the gate is formed to such a tapered shape that the diameter is gradually increased toward the bottom portion (cavity) from the nozzle. It is preferred that the tapering inclination angle ($\theta$) be 1° to 10°, especially 2° to 8°.

(7) Facilitation of flowing of the resin into the cavity from the gate is effective for controlling the ratio (V) of the thermal crystallization degree to a small value, and for this purpose, it is preferred that the curvature radius $R_G$ of the exit portion of the gate corresponding to the bottom portion be reduced. An optimum value is present for this curvature radius $R_G$, and it is generally preferred that the curvature radius $R_G$ be 0.1 to 3.0 mm, especially 0.3 to 2.0 mm.

(8) For the same purpose as described in (7) above, it is preferred that the curvature radius $R_C$ of the cavity portion of the mold corresponding to the bottom portion be increased. An optimum value is present also for the curvature radius $R_C$. It is generally preferred that the curvature radius $R_C$ be 2 to 10 mm, especially 4 to 8 mm.

The so-prepared bottomed preform is preliminarily heated at a drawing temperature lower than the crystallization temperature, generally at 80° to 120° C., especially at 85° to 115° C., and the preform is stretched and drawn in the axial direction in a blow-forming mold while expanding and drawing the preform in the circumferential direction by blowing a gas into the parison, whereby a biaxially drawn vessel is obtained. The draw ratio is not particularly critical, but it is generally preferred that the draw ratio in the axial direction be 1.1 to 3.0 and the draw ratio in the circumferential direction be 3.0 to 5.0.

Of course, in the production of the bottomed preform by injection molding, not only a bottomed preform composed solely of a polyester is formed by also a multi-layer preform comprising inner and outer layers composed of a thermoplastic polyester and an intermediate layer composed of a gas-barrier resin such as an ethylene/vinyl alcohol copolymer or poly-m-xylylene adipamide or a heat-resistant resin such as a polyacrylate can be formed by the co-injection molding method.

Needless to say, in the above-mention biaxial draw-blowing, even in the case where the mold is heated to effect so-called heat setting for imparting a heat resistance to the polyester vessel, if the catalyst residue is contained in the bottom portion of the formed vessel in an amount smaller than 1000 ppm as the metal and the ratio (V) of the thermal crystallization degree of the bottom portion is lower than 90%, the intended object of the present invention can be attained.

The process for the preparation of the vessel of the present invention is not limited to the above-mentioned process. For example, a parison, sheet, pipe or bottomed preform for formation of a hollow vessel having a single layer or multi-layer structure can be easily prepared by extrusion molding, compression molding, blow molding or a combination thereof. A cup-shaped or tray-shaped vessel having an unoriented or monoaxially oriented side wall or a bottomed polyester can body to be wrap-seamed with a metal lid can be obtained by overhanging molding of a sheet. Of course, the interior and/or exterior of a pre-formed body such as the above-mentioned parison, sheet or bottomed preform or a formed vessel such as a bottle or cup may be coated with other resin such as polyvinylidene chloride so as to impart such properties as gas-barrier property and gloss. Moreover, a bottomed preform for draw-blow-forming can be obtained by bottoming a pipe.

In the above-mentioned vessel, bottomed can barrel or bottomed preform, even in the case where the mold is heated to effect heat setting for imparting a heat resistance, if the catalyst residue is contained in the bottom portion of the formed vessel in an amount smaller than 1000 ppm as the metal and the ratio (V) of the thermal crystallization degree of the bottom portion is lower than 90%, the intended object of the present invention can be attained.

Furthermore, a plastic can barrel to be wrap-seamed with metal lids on both the ends can be obtained by stretch-drawing a pipe in one direction or draw-blow-forming a pipe in two directions.

Uses

Since the acetaldehyde concentration is controlled to a low level in the polyester vessel of the present invention, the polyester vessel of the present invention is very useful for containing contents, the flavor of which is substantially degraded by the presence of acetaldehyde, and preserving the flavor of these contents.

Accordingly, the vessel of the present invention is useful for containing oil and fat foods such as frying oil and salad oil; seasonings such as mayonnase, dressing and ketchup; syrups such as shaved ice treacle and cakes such as soft adzuki-bean jelly and other jelly; alcoholic drinks such as distilled spirits; carbonated drinks such as cola, soda pop and plain soda; straight juices such as lemon juice, orange juice, plum juice, grape juice and strawberry juice and fruit drinks such as Nector and agar-incorporated fruit drink; retortable drinks such as coffee and black tea; healthy drinks such as vitamin-reinforced drink, aloe drink, herb drink, healthy vinegar drink and isotonic drink; sugar-less drinks such as green tea, seaweed drink, oolong tea, hydrangea tea, adlay tea, mate tea, persimmon leaf tea, ginseng tea, corn potage, consomme, shellfish extract drink and mineral water; lactic acid beverages; and fermented milk drinks.

Since the polyester vessel of the present invention is excellent in falling shock resistance, environmental stress crack resistance (ESCR) and resistance to shrinkage with the lapse of time, the vessel of the present invention can be used for containing various foods, drinks and various non-edible products. As the liquid, pasty and gelatinous foods, there can be mentioned stews such as precooked curry stew, precooked hash stew, borsch and beef stew; sauces such as meat sauce; boiled vegetables, fish and meat such as sweet-and-sour pork, sukiyaki, happosai, Chinese hotchpotch, boiled asparagus and cream-boiled tuna; soups such as miso soup, miso soup with pork and vegetables and vegetable stew with oil; noodles such as spagetti, buckwheat vermicelli, wheat vermicelli, Chinese vermicelli and macaroni; composite seasonings for Chinese fried rice, soup and Chinese vermicelli; fancy foods such as boiled adzuki beans, adzuki bean soup with rice cake and jelly with sweetened adzuki beans; processed fish and meat products such as hamburger, meat ball, corned beef, ham, sausage, roast pork, bacon and boiled fish past; foamy spirits, e.g., beer, sake, whisky and fruit wine, e.g., grape wine cocktail drinks, e.g., gin fizz and other alcoholic drinks; vegetable drinks such as tomato juice and vegetable juice; artificial drinks and vintamin-reinforced drinks formed by using a saccharide such as sugar or fructose, citric acid, a colorant, a perfume, if necessary, a vitamin; seasonings such as soy sauce, Worcester sauce, vinegar, sweetened sake, miso past and lard; and other foods such as bean curd, jam, butter and margarin. As the non-edible products, there can be mentioned liquid medicines, agricultural chemicals and cosmetics; various detergents; ketones such as acetone and methylethylketone; aliphatic hydrocarbons such as n-hexane and n-heptane; alicyclic hydrocarbons such as cyclohexane; aromatic hydrocarbons such as benzene, toluene and zylene; chlorine-containing compounds such as carbon tetrachloride and tetrachloroethylene; various fatty acids; and gasoline, kerosene, petroleum benzine, fuel oil, thinner, grease, silicone oil, light oil and machine oil.

According to the present invention, the acetaldehyde concentration in the vessel wall can be conspicuously reduced, and therefore, the flavor-retaining property can be highly improved. Moreover, the impact strength and environmental stress crack resistance of the bottom portion which is a most important structural portion of the vessel and the resistance of the vessel to the shrinkage with the lapse of time (post shrinkage) can be improved.

The present invention will now be described in detail with reference to the following examples that by no means limit the scope of the invention.

The measurement methods adopted in the examples are described below.

(1) Differential Thermal Analysis (DSC)

In the present invention, a micro-sample differential analysis apparatus (Model Thermo-Flex supplied by Rigaku Denki) was used for the differential thermal analysis.

The measurement conditions adopted are as follows.
(i) Sample weight: 14.5±0.5 mg
(ii) Sensitivity of DSC: ±4 mcal/sec
(iii) Temperature-elevating rate: 10.0° C./min on average (room temperature to 290° C.)
(iv) Temperature-lowering rate: 11.5° C. on average (from 290° C. to 150° C.)
(v) Temperature full scale: 20 mV (0° to 500° C.)

Since the temperature full scale was in the range of from 0° to 500° C., the measured temperature included a reading error of ±2° C.

The heat quantity of crystallization at elevation of the temperature, the endothermic quantity of melting at elevation of the temperature and the heat quantity of crystallization at lowering of the temperature were determined according to the following procedures.

1. As shown in FIGS. 2-A through 2-D, respective endothermic and exothermic portions were transcribed on a thin copying graph paper, and these portions were cut out by scissors. Then, a portion of 20 cm² (4 cm × 5 cm) was similarly cut out.

2. The weights of the respective portions and the weight of the control portion of 20 cm² were measured at a precision of 0.1 mg by using a precision to balance.

3. The area (cm²) of each endothermic or exothermic portion was calculated according to the following formula:

Ares of each portion = 20 cm² × weight of each portion/weight of control portion (20 cm²)

4. The heat quantity ($Q_{AC}$) of crystallization at elevation of the temperature, the endothermic quantity ($Q_M$) of melting at elevation of the temperature and the heat quantity ($Q_{DC}$) of crystallization at lowering of the temperature were calculated according to the following formulae, respectively:

$Q_{AC}$ = area of exothermic portion of crystallization at elevation of temperature/weight of sample $Q_M$ = area of endothermic portion of melting at elevation of temperature/weight of sample $Q_{DC}$ = area of exothermic portion of crystallization at lowering temperature/weight of sample The measurement was conducted three times with respect to each sample. The obtained values agreed with one another within a relative error of 5%. Accordingly, each heat quantity was expressed by the arithmetic mean of the three values.

It was examined whether or not the sample was deteriorated by oxidation or carbonization by the above-mentioned measurement under the above-mentioned conditions. This could be judged by the significant difference test (t-test) of the change of the weight of the sample before and after the measurement.

More specifically, with respect to randomly collected 15 samples, the average weight of the samples (including the weight of the sample holder of aluminum) before the measurement was 33.75 mg (standard deviation=0.43 mg), and the average weight (including the weight of the sample holder) after the measurement was 33.34 mg (standard deviation=0.40 mg). The t value calculated from these average values and standard deviations was 1.51, and this value indicates that there was no significant difference (t=1.70) even at a significant level of 10%. Namely, it is concluded that "deterioration was not caused in the sample by the above-mentioned measurement under the above-mentioned conditions".

Incidentally, the significant difference test (t-test) was carried out according to the teachings of Toshio Nonaka and Toshio Sasai, "Complete Mathematical Practices, Volume 9, Practices of Probability and Statistics, Chapter 7, Test", pages 173–198, published by Morikita Suppan in Tokyo (1961).

(2) Atomic Absorption Spectroscopy

The qualitative analysis of metal elements of the sample was carried out by using an electron probe microanalyzer (EPMA) (Model EMAX-1500 supplied by Horiba Seisakusho), and the quantitative analysis of the catalyst, as the metal, of the sample was carried out according to the atomic absorption spectroscopy.

Incidentally, an atomic absorption spectrophotometer (Model 646 supplied by Shimazu Seisakusho) was used for the atomic absorption spectroscopy, and the measurement was conducted according to the teachings of Masayuki Tanaka and Yoshio Iida, "Basic Chemistry Selection, Volume 7, Machine Analysis, Chapter 7, Atomic absorption Spectroscopy", pages 100–109, published by Shokabo in Tokyo (1977), and other references.

(3) Inherent Viscosity (IV) of Thermoplastic Polyester

An Ubbellohde viscometer was used. The measurement was carried out at 30° C. in a mixed solvent comprising phenol and tetrachloroethane at a weight ratio of 6/4.

(4) Diethylene Glyco Concentration (DEG) in Thermoplastic Polyester

Monoethanolamine (MES) was added to the thermoplastic polyester and the mixture was heated and decomposed on a hot plate maintained at 280° C., and the determination was carried out according to the internal standard method (internal standard substance: 0.01 g of 1,6-hexanediol in 20 ml of methanol) using a gas chromatograph (model Gc-9A supplied by Shimazu Seisakusho).

The diethylene glycol concentration was calculated according to the following formula:

$$DEG = (Z \times Y \times F/B \times W) \times 100$$

wherein DEG stands for the concentration (% by weight) of diethylene glycol, A stands for the peak area of diethylene glycol, Y stands for the weight of the internal standard substance, F stands for the correction coefficient of diethylene glycol, B stands for the peak area of the internal standard substance and W stands for the weight of the sample.

(5) Amount of Acetaldehyde in Material

The determination of the amount of acetaldehyde in the material was carried out according to the Celanease method. Namely, about 2 g of the bottom portion of the sample was pulverized in liquified nitrogen, and of the pulverized sample, 30 to 40 mg was filled in a glass insert, the weight of which had been precisely measured in advance, and the sample was introduced into an injection zone of a direct gas chromatograph (Model GC-6A supplied by Shimazu Seisakusho) and heated at 145° C. for 20 minutes. The temperature of a column (PolapackQ; 3 mm in diameter and 2 m in length) to 140° C. from room temperature and acetaldehyde was analyzed. After the measurement, the weight of the sample and the glass insert was precisely measured and the weight of the sample was calculated by subtracting the weight of the glass insert from the measured weight. The measurement was conducted three times and the mean value was calculated.

(6) Falling Strength (Fv)

Ten vessels were tested with respect to each sample. A certain amount of an aqueous solution of sodium chloride was filled in each vessel, and the mouth portion was sealed and the vessel was allowed to stand in an atmosphere maintained at $-2°$ C. two whole days and nights.

Then, the vessel was let to fall down on a concrete surface from a height of 120 cm at a temperature of 5° C. so that the bottom face of the vessel impinged against the concrete surface. Falling was repeated 10 times at largest.

The break ratio was calculated from the number of the vessels which were not broken even after falling was repeated 10 times according to the following formula:

Break ratio $(Fv) = 100 \times (N - n10/)N(\%)$ wherein N stands for the number ($=10$) of the vessels tested and n10 stands for the number of the vessels which were not broken after falling was repeated 10 times.

(7) Environmental Stress Crack Resistance (ESCR of Bottom Portion)

The vessels were tested with respect to each sample. Each vessel was filled with a commercially available bleaching agent (Bleach) in an amount of about 10% by volume of the full volume of the vessel. The mouth portion of the vessel was sealed and the vessel was placed in an atmosphere maintained at 55° C. in such a manner that the mouth portion was located below.

At intervals of 48 hours, it was checked with the naked eye whether or not cracks were formed in the bottom portion of the vessel.

The time at which cracks were formed in the bottom portions of at least 5 vessels among the tested 10 vessels was designated as "ESCR of bottom portion". The test was conducted over a period of 10 hours.

(8) Post Shrinkage (St)

Ten vessels were tested with respect to each sample. Each vessel was allowed to stand at room temperature for 2 days after the formation, and the vessel was completely filled with water at 20° C. and the volume of filled water was measured.

Then, water was removed, and the vessel was allowed to stand in an atmosphere maintained at 37° C. for 25 hours. Then, the vessel was allowed to stand at room temperature for 1 day, and the vessel was completely filled with water at 20° C. again the volume of filled water was measured.

The post shrinkage (St) was calculated according to the following formula:

Post Shrinkage $(St) = 100 \times (V2 - V28)/V2(\%)$ wherein V2 stands for the volume (ml) of fully filled water after 2 days from the formation, and V28 stands for the volume (ml) of fully filled water after 28 days from the formation.

The arithmetic mean of the post shrinkages of the 10 vessels was designated as the post shrinkage (St).

EXAMPLE 1

Polyethylene terephthalate having an inherent viscosity (IV) of 0.73 dl/g and a diethylene glycol concentration (DEG) of 1.25% by weight (it was confirmed by the EPMA method that germanium Ge as the catalyst metal, phosphorus P and titanium Ti as the trace element were contained) was molded into test pieces having a width of 1 inch, a length of 2 inches and a thickness of 0.02 inch by using an injection molding machine (Model FS-170N supplied by Nissei Jushi Kogyo).

The dimensions of the portion near the gate of the injection molding machine were as follows.

(i) Material and Roughness of Injection Mold: Berrylium-copper alloy having a roughness not larger than 0.4 μm (ii) Gate Land Length l of Mold: 6.0 mm (iii) Sectional Area $S_1$ of Gate on the Side of Mold Cavity (Exit): 9.1 mm²

(iv) Tapering Inclination Angle $\theta$ of Gate: 3°

(v) Curvature Radius $R_C$ of Exit Portion of Gate: 1.0 mm

The injection molding conditions adopted were as follows.

(1) Set Temperature of Barrel: 250° C. (rear portion), 265° C. (intermediate portion), 270° C. (front portion, 275° C. (nozzle portion)

(2) Resin Temperature: 285° C.

(3) Rotation Number of Screws: 70 rpm (4) Injection Pressure: 41 to 52 kg/cm²

Thirteen test pieces were obtained by adjusting the temperature of the injection mold to 5° C. (S-10), 10° C. (S-20), 20° C. (S-30), 30° C. (S-40), 50° C. (S-50), 60° C. (S-52), 70° C. (S-53), 80° C. (S-55), 90° C. (S-60), 100° C. (S-70), 120° C. (S-75), 180° C. (S-80) or 200° C. (S-90) by using cooling water, warm water or a silicone oil. Parenthesized symbols correspond to sample marks described in the tables given hereinafter.

With respect to each of the so-obtained thirteen samples, the portion adjacent to the gate was subjected to the differential thermal analysis (DSC) according to the above-mentioned methods. Peak temperatures of the respective samples are shown in Table 1. The following can be seen from Table 1.

(1) In each sample, the glass transition temperature (Tg) was about 84° C. and the melting peak temperature (Tm) was about 254° C., and these temperatures were constant in the respective samples within the range of the measurement error.

(2) The exothermic temperature (Tac1, Tac2) of crystallization at elevation of the temperature was 130° to 150° C., and although a single peak was observed at a low mold temperature, two exothermic peaks gradually appeared as the mold temperature became high. If the mold temperature was further elevated, a single peak appeared again.

(3) The exothermic temperature (Tdc1, Tdc2) of crystallization at lowering of the temperature was 210° to 185° C. and a tendency similar to the tendency observed with respect to the exothermic temperature of crystallization at elevation of the temperature was observed.

The heat quantity ($Q_{AC}$) of crystallization at elevation of the temperature, the heat quantity ($Q_M$) of melting and the heat quantity ($Q_{DC}$) of crystallization at lowering of the temperature, determined with respect to each sample, and the ratio (V) of the thermal crystallization degree calculated from these heat quantities are shown in Tables 2 and 3. From the data shown in Tables 2 and 3, it is seen that the value of the ratio (V) of the thermal crystallization degree differed among (i) the case where the mold temperature was lower than 50° C., (ii) the case where the mold temperature was 50° to 175° C. and (iii) the case where the mold temperature was higher than 175° C., and that if the mold temperature was higher than 175° C., the value V abruptly inceased.

With respect to these 13 samples, the acetaldehyde amount (AA) in the material was measured according to the above-mentioned method. The obtained results are shown in Table 3. The relation between the ratio of the thermal cystallization degree and the acetaldehyde amount in the material in Table 3 is shown in FIG. 1. From Table 3 and FIG. 1, it is seen that if the value of the ratio (V) of the thermal crystallization degree exceeded 90%, the acetaldehyde amount (AA) in the material was drastically increased.

With respect to each of the foregoing 13 samples, test pieces were collectively ashed, and the atomic absorption spectroscopy was carried out according to the above-mentioned method. It was confirmed that 51 ppm of germanium (Ge) and 59 ppm of phosphorus (P) were contained as the metal in the test pieces of the 13 samples. The detection of titanium (Ti) was impossible (ND) at a precision corresponding to the detection limit.

TABLE 1

| Sample | Tg (°C.) | Tac1 (°C.) | Tac2 (°C.) | Tm (°C.) | Tdc1 (°C.) | Tdc2 (°C.) | Mold Temperature |
|---|---|---|---|---|---|---|---|
| S-10 | 83 | 139 | 139 | 253 | *205 | 190 | 5° C. |
| S-20 | 84 | 139 | 139 | 253 | *206 | 189 | 10° C. |
| S-30 | 85 | 139 | 139 | 253 | *207 | 190 | 20° C. |
| S-40 | 82 | 132 | 132 | 254 | 209 | <u>186</u> | 30° C. |
| S-50 | 82 | 135 | 135 | 254 | *207 | 188 | 50° C. |
| S-52 | 83 | <u>132</u> | *145 | 255 | *207 | 191 | 60° C. |
| S-53 | 84 | <u>131</u> | 146 | 255 | 189 | 189 | 70° C. |
| S-55 | 83 | 131 | <u>145</u> | 254 | 189 | 189 | 80° C. |
| S-60 | 83 | 131 | <u>143</u> | 254 | 196 | 196 | 90° C. |
| S-70 | 83 | <u>131</u> | *141 | 253 | 193 | 193 | 100° C. |
| S-75 | 82 | 135 | 135 | 254 | 191 | 191 | 120° C. |
| S-80 | *88 | 136 | 136 | 255 | 190 | 190 | 180° C. |
| S-90 | *87 | (141) | (141) | 255 | 190 | 190 | 200° C. |

Note
Tg: glass transition temperature
Tac1: crystallization peak temperature on the low temperature side at elevation of the temperature
Tac2: crystallization peak temperature on the high temperature side at elevation of the temperature
Tm: melting peak temperature
Tdc1: crystallization peak temperature on the high temperature side at lowering of the temperature
tdc2: crystallization peak temperature on the low temperature side at lowering of the temperature
__: the underline indicates the main peak
*: trace or bending point

TABLE 2

| Sample | Weight (mg) | Heat Quantity of Crystallization at Elevation of Temperature (cm²/mg) | Heat Quantity of Melting (cm²/mg) | Heat Quantity of Crystallization at Temperature (cm²/mg) | Thermal Crystallization Degree Ratio (%) |
|---|---|---|---|---|---|
| S-10 | 14.5 | 0.219 | 0.282 | 0.282 | 22.3 |
| S-20 | 14.2 | 0.19<u>5</u> | 0.27<u>5</u> | 0.264 | 26.3 |
| S-30 | 14.3 | 0.204 | 0.278 | 0.264 | 22.9 |
| S-40 | 14.6 | 0.173 | 0.281 | 0.252 | 31.2 |
| S-50 | 14.2 | 0.134 | 0.262 | 0.242 | 44.<u>5</u> |
| S-52 | 14.4 | 0.156 | 0.28<u>5</u> | 0.273 | 42.9 |
| S-53 | 14.3 | 0.150 | 0.268 | 0.272 | 44.7 |
| S-55 | 14.7 | 0.153 | 0.291 | 0.268 | 42.9 |
| S-60 | 14.6 | 0.134 | 0.281 | 0.257 | 47.6 |
| S-70 | 14.5 | 0.090 | 0.260 | 0.240 | 62.2 |
| S-75 | 14.3 | 0.054 | 0.260 | 0.280 | 80.7 |
| S-80 | 14.3 | 0.015 | 0.282 | 0.172 | 91.1 |
| S-90 | 14.7 | 0.010 | 0.240 | 0.136 | 92.7 |

Note
Heat quantity = (20 cm² × weight of each portion) × (20 cm² × weight of control portion)
Heat quantity of crystallization at elevation of temperature: $Q_{AC}$
Heat quantity of melting: $Q_M$
Heat quantity of crystallization at lowering of temperature: $Q_{DC}$
Thermal crystallization degree ratio $V = 100 \times (Q_{DC} - Q_{AC})/Q_{DC}$

TABLE 3

| Sample | Mold Temperature (°C.) | Thermal Crystallization Degree Ratio (%) | AA Amount in Material (ppm) |
|---|---|---|---|
| S-10 | 5 | 22.3 | 2.6 |
| S-20 | 10 | 26.3 | 3.2 |
| S-30 | 20 | 22.9 | 2.4 |
| S-40 | 30 | 31.2 | 4.0 |
| S-50 | 50 | 44.5<u>5</u> | 4.3 |
| S-52 | 60 | 42.9 | 5.2 |
| S-53 | 70 | 44.7 | 5.0 |
| S-55 | 80 | 42.9 | 5.3 |
| S-60 | 90 | 47.6 | 5.8 |
| S-70 | 100 | 62.2 | 6.9 |
| S-75 | 120 | 80.7 | 10.6 |
| S-80 | 180 | 91.1 | 83.2 |
| S-90 | 200 | 92.7 | 98.5 |

Note
Thermal crystallization degree ratio = 100 × (heat quantity of crystallization at lowering of temperature − heat quantity of crystallization at elevation of temperature)/heat quantity of crystallization at lowering of temperature.

EXAMPLE 2

A bottomed preform having a weight of 37 g and a thickness of 4 mm was formed from the polyethylene terephthalate used in Example 1 by using the injection molding machine used in Example 1. The dimensions of the portion near the bottom gate of the injection molding machine were as follows.

(i) Material and Roughness of Injection Mold: Beryllium-copper alloy having a roughness not larger than 0.4 μm
(ii) Gate Land Length l of Mold: 6.0 mm
(iii) Sectional Area $S_1$ of Gate on the Side of Mold Cavity (Exit): 9.1 mm$^2$
(iv) Ratio $S_1/S_2$ of $S_1$ to Sectional Area of Cavity: 0.13
(v) Tapering Inclination Angle θ of Gate: 3°
(vi) Curvature Radius $R_G$ of Exit of Gate: 1.0 mm
(vii) Curvature Radius $R_C$ of Bottom of Cavity: 6.0 mm The injection conditions, except the temperature of the bottom portion of the injection mold, were substantially the same as described in Example 1.

The temperature of the bottom portion of the injection mold was adjusted to 5° C. (T01B), 20° C. (T02B), 50° C. (T03B), 100° C. (T04B) or 180° C. (T05B) according to the same method as described in Example 1, and thus, 5 bottomed preforms were obtained. The parenthesized symbols correspond to sample marks shown in the tables given hereinafter.

These five bottomed preforms were formed into cylindrical bottles having a full inner volume of about 1035 ml (a weight of 37 g) by using a biaxial draw-blow-forming machine (Model OBM-1G supplied by Toyo Shokuhin Kikai). The bottle-forming conditions were such that the preform was heated at 100° C. for 30 seconds and blow-forming was carried out for 4 seconds in the form.

These five bottles were subjected to the differential thermal analysis (DSC) of the bottom portion according to the above-mentioned method. Peak temperatures of the respective samples are shown in Table 4. The same characteristics as observed in Example 1 were similarly seen from the results shown in Table 4.

The heat quantity ($Q_{AC}$) of crystallization at elevation of the temperature, the heat quantity ($Q_M$) of melting and the heat quantity ($Q_{DC}$) of crystallization at lowering of the temperature, determined with respect to each sample, and the thermal crystallization degree ratio (V) calculated from these heat quantities are shown in Table 5. From Table 5, it is seen that the thermal crystallization degree ratio (V value) was gradually increased from T01B to T05B.

With respect to each of these five bottles, the bottom portion and side wall portion of the bottle was subjected to the atomic absorption spectroscopy according to the above-mentioned method. The obtained results are shown in Table 5. In the column of the catalyst (amounts of catalyst Ge, catalyst P and catalyst Ti) in Table 5, the left value indicates the catalyst amount in the bottom portion of the bottle and the right value indicates the catalyst amount in the side wall portion of the bottle. From the results shown in Table 5, it is seen that the amount of the germanium (Ge) catalyst was hardly changed or slightly changed in the bottom portion from T01B to T05B, but the amount of the phosphorus (P) catalyst was apparently reduced in the bottom portion and increased in the side wall portion.

With respect to each of the so-obtained five bottles, the amounts of acetaldehyde (AA amounts in the material) in the bottom and side wall portions, the falling strength, the environmental stress crack resistance (ESCR of the bottom portion) and the post shrinkage were determined according to the above-mentioned methods. The obtained results are shown in Table 5. Incidentally, in the column of the remarks in Table 5, the injection moldability and blow formability are shown.

In the column of the AA amount of the material in Table 5, the left value indicates the AA amount of the bottle portion of the bottle and the right value indicates the AA amount of the side wall portion of the bottle. From Table 5, it is seen that the amount of acetaldehyde in the material was hardly changed in the side wall portion from T01B to T05B but in the bottom portion, the amount of acetaldehyde was gradually increased form T01B to T05B and this increase was especially conspicuous between T04B and T05B. Furthermore, The AA amount in the bottom portion of the bottle is shown in FIG. 1.

With reference to the falling strength, from the results shown in Table 5, it is seen that the break ratio (Fv) was lower than 10% in T01B through T04B but the break ratio (Fv) was 100% in T05B, and under conditions of T05B, all of 10 sample bottles were broken.

With reference to ESCR of the bottom portion, in bottles T01B through T04B, the time required for breaking of 5 sample bottles among 10 sample bottles was longer than 240 hours (10 days), but in case of T05B, cracks were formed in 5 sample bottles among 10 sample bottles within 72 hours (3 days) after the initiation of the test.

Moreover, from Table 5, it is seen that the post shrinkage of T05B was much higher than those of other bottles.

TABLE 4

| Sample | Tg (°C.) | Tac1 (°C.) | Tac2 (°C.) | Tm (°C.) | Tdc1 (°C.) | Tdc2 (°C.) | Mold Temperature |
|---|---|---|---|---|---|---|---|
| T01B | 82 | *127 | 137 | 253 | *205 | 188 | 5° C. |
| T02B | 84 | *131 | 141 | 253 | *209 | 191 | °C. |
| T03B | 82 | 132 | <u>141</u> | 255 | *206 | 187 | 50° C. |
| T04B | 82 | 137 | 137 | 254 | 188 | 188 | 100° C. |
| T05B | *87 | 139 | 139 | 253 | 194 | 194 | 180° C. |

Note
Tg: glass transition temperature
Tac1: peak temperature of crystallization on low temperature side at elevation of temperature
Tac2: peak temperature of crystallization on high temperature side at elevation of temperature
Tm: melting peak temperature
Tdc1: peak temperature of crystallization on high temperature side at lowering of temperature
Tdc2: peak temperature of crystallization on low temperature side at lowering of temperature
___ : underline indicates main peak
*: trace or bending point mold temperature: temperature of bottom portion of mold

TABLE 5

| Bottle | T01B | T02B | T03B | T04B | T05B |
|---|---|---|---|---|---|
| Bottom Weight by DSC | 14.6 | 14.3 | 14.5 | 14.4 | 14.5 |
| Heat Quantity of Crystallization at Elevation of Temperature | 0.20 | 0.21 | 0.15 | 0.09 | 0.02 |

TABLE 5-continued

| Bottle | TO1B | TO2B | TO3B | TO4B | TO5B |
| --- | --- | --- | --- | --- | --- |
| Melting Heat Quantity | 0.26 | 0.27 | 0.27 | 0.27 | 0.31 |
| Heat Quantity of Crystallization at Lowering of Temperature | 0.26 | 0.26 | 0.26 | 0.24 | 0.22 |
| Thermal Crystallization Degree Ratio | 24.2 | 21.1 | 41.5 | 62.6 | 90.5 |
| Catalyst Ge Amount, ppm | 54/48 | 49/54 | 52/49 | 56/46 | 64/38 |
| Catalyst P Amount, ppm | 96/25 | 102/19 | 97/21 | 66/44 | 8/110 |
| Catalyst Ti Amount, ppm | ND/ND | ND/ND | ND/ND | ND/ND | ND/ND |
| AA Amount in Material, ppm | 4.5/6.2 | 2.1/7.1 | 3.6/6.5 | 6.5/4.3 | 75.9/2.0 |
| Falling Strength, % | 0 | 0 | 0 | 10 | 100 |
| Bottom ESCR, hours | >240 | >240 | >240 | >240 | 72 |
| Post Shrinkage, % | 1.4 | 1.0 | 0.7 | 2.9 | 10.4 |
| Remarks | no trouble | no trouble | no trouble | slight short-mold in preform | misufficient molding often occured in blow forming |

Note
(1) Thermal crystallization degree ratio $V = 100 \times (Q_{DC} - Q_{AC})/Q_{DC}$
$Q_{AC}$: heat quantity cm$^2$/mg of crystallization at elevation of temperature
$Q_{DC}$: heat quantity cm$^2$/mg of crystallization at lowering of temperature
(2) In the column of the catalyst amount, the numerator indicates the catalyst amount in the bottom portion and the denominator indicates the catalyst amount in the side wall portion (determined by atomic absorption spectroscopy; ND indicates "not detectable"; the detection limit was 5 ppm)
(3) In the column of the AA (acetaldehyde) amount in the material, the numerator indicates the AA amount in the bottom portion and the denominator indicates the AA amount in the side wall portion.

EXAMPLE 3

Of the five bottles described in Example 2, the bottles T02B, T04B and T05B were fully filled with a salad oil contained in a 1400-gram square can, and the filled bottles were stored in a thermostat chamber (in the dark place) at 37° C. for 14 days. Then, about 200 ml of the salad oil was transferred into a beaker having a volume of 300 ml and maintained at about 60° C. on a hot plate. Separately, about 200 ml of the salad oil just after opening of the square can was transferred to a beaker having a volume of 300 ml and maintained at about 60° C. By 21 panel experts, (1) the salad oil in the bottle T02B was compared with the salad oil in the bottle T04B, (2) the salad oil in the bottle T02B was compared with the salad oil in T05B, and (3) the salad oil in the bottle T04B was compared with the salad oil in the bottle T05B. Namely, it was judged which of the salad oils filled in the two compared bottles in each of (1) through (3) described above had a flavor closer to the flavor of the control salad oil just after opening of the square can.

In the comparison (1), of the 21 experts, 10 experts answered that the salad oil filled in the bottle T02B had a flavor closer to that of the control salad oil (contained in the square can), 9 experts answered that the flavor of the salad oil in the bottle T04B had a flavor closer to that of the control salad oil, and two experts answered that the two bottles were comparable to each other in the flavor-retaining property.

In the comparison (2), all of the 21 experts answered that the salad oil filled in the bottle T02B had a flavor closer to that of the flavor of the control salad oil.

In the comparison (3), all of the 21 experts answered that the flavor of the salad oil filled in the bottle T04B was closer to the flavor of the control salad oil.

EXAMPLE 4

Polyethylene terephthalate having an intrinsic viscosity (IV) of 0.66 dl/g and a diethylene glycol concentration (DEG) of 2.11% by weight (by the EPMA method, it was confirmed that titanium Ti and phosphorus P were contained as the catalyst metal) was formed into a cylindrical bottle having a weight of 33 g and a full volume of about 615 ml by using an injection/biaxial draw-blow-forming machine (Model ASB-650NH supplied by Nissei ASB Kikai).

The following three types of shapes were adopted for the portion adjacent to the gate of the injection zone.
(1) Type A
  (i) Material and Roughness of Injection Mold: Beryllium-copper alloy having a roughness not larger than 0.4 μm
  (ii) Gate Land Length l of Mold: 6.0 mm
  (iii) Sectional Area $S_1$ of Gate on the Side of Mold Cavity (Exit): 9.1 mm$^2$
  (iv) Ratio $S_1/S_2$ of $S_1$ to Sectional Area of Cavity: 0.017
  (v) Tapering Inclination Angle θ of Gate: 3°
  (vi) Curvature Radius of Exit Portion $R_G$ of Gate: 1.0 mm
  (vii) Curvature Radius $R_C$ of Bottom Portion of Cavity: 6.0 mm
(2) Type B
  (i) Material and Roughness of Injection Mold: Beryllium-copper alloy having a roughness not larger than 0.4 μm
  (ii) Gate Land Length l of Mold: 16.0 mm
  (iii) Sectional Area $S_1$ of Gate on the Side of Mold Cavity (Exit): 15.8 mm$^2$
  (iv) Ratio $S_1/S_2$ of $S_1$ to Sectional Area of Cavity: 0.030
  (v) Tapering Inclination Angle θ of Gate: 4°
  (vi) Curvature Radius $R_G$ of Exit Portion of Gate: 1.0 mm
  (vii) Curvature Radius $R_C$ of Bottom Portion of Cavity: 6.0 mm
(3) Type C
  (i) Material and Roughness of Injection Mold: Beryllium-copper alloy having a roughness not larger than 6.3 μm
  (ii) Gate Land Length l of Mold: 1.5 mm
  (iii) Sectional Area $S_1$ of Gate on the Side of Mold Cavity (Exit): 1.5 mm$^2$
  (iv) Ratio $S_1/S_2$ of $S_1$ to Sectional Area of Cavity: 0.003
  (v) Tapering Inclination Angle θ of Gate: 0.5°
  (vi) Curvature Radius $R_G$ of Exit Portion of Gate: 1.0 mm (vii) Curvature Radius $R_C$ of Bottom Portion of Cavity: 6.0 mm The injection molding conditions adopted were as follows.

(1) Set Temperature of Barrel: 255° C. (rear portion), 270° C. (intermediate portion), 280° C. (front portion), 285° C. (nozzle portion)
(2) Resin Temperature: 300° C.
(3) Rotation Number of Screw: 120 to 180 rpm
(4) Injection Pressure: 190 to 340 kg/cm²
(5) Temperature of Cooling Water 15° C.
(6) Molding Cycle: 20 to 29 seconds Of the so-obtained three bottles, the bottle formed by using type A for the shape of the portion adjacent to the gate of the injection zone was designated as bottle N4AB, the bottle formed by using type B for the shape was designated as bottle N4BB, and the bottle formed by using type C for the shape was designated as bottle N4CB.

These three kinds of the bottles were subjected to the differential thermal analysis according to the above-mentioned method. The peak temperatures of each sample are shown in Table 6.

The quantity ($Q_{AC}$) of crystallization at elevation of the temperature, the melting heat quantity ($Q_M$) and the heat quantity ($Q_{DC}$) of crystallization at lowering of the temperature, determined with respect to each sample, and the thermal crystallization degree ratio (V) calculated from these heat quantity are shown in Table 7.

With respect to each of these three sample bottles, the bottom portion of the bottle and the side wall portion of the bottle for the comparison were subjected to the atomic absorption spectroscopy. The obtained results are shown in Table 7. The manner of indication in the column of the catalyst amount in Table 7 is the same as in Example 2.

With respect to the three sample bottles, the acetaldehyde amounts (AA amounts) of the bottom portion and the side wall portion for the comparison (the manner of indication in the column of the AA amount is the same as in Example 2), the falling strength, the environmental stress crack resistance (ESCR of the bottom portion) and the post shrinkage were measured according to the above-mentioned methods.

The obtained results are shown in Table 7. In the column of "Remarks" in Table 7, the injection moldability and the blow formability are shown.

TABLE 6

| Sample | Tg (°C.) | Tac1 (°C.) | Tac2 (°C.) | Tm (°C.) | Tdc1 (°C.) | Tdc2 (°C.) | Shape of Portion Adjacent to Bottom Gate |
| --- | --- | --- | --- | --- | --- | --- | --- |
| N4AB | 85 | 131 | 131 | 254 | 190 | 190 | type A |
| N4BB | 84 | *131 | 141 | 253 | *209 | 191 | type B |
| N4CB | *87 | 139 | 139 | 254 | 194 | 194 | type C |

Note
Each symbol has the same meaning as described in the Note of Table 1.

TABLE 7

| Bottle | N4AB | N4BB | N4CB |
| --- | --- | --- | --- |
| Weight of Bottom Portion by DSC | 14.7 | 14.3 | 14.5 |
| Heat Quantity of Crystallization at Elevation of Temperature | 0.16 | 0.20 | 0.03 |
| Heat Quantity of Melting | 0.27 | 0.26 | 0.34 |
| Heat Quantity of Crystallization at Lowering of Temperature | 0.28 | 0.26 | 0.26 |
| Thermal Crystallization Degree Ratio | 43.2 | 23.7 | 90.4 |
| Catalyst Ti Amount, ppm | 92/84 | 80/102 | 102/77 |
| Catalyst P Amount, ppm | 66/76 | 84/54 | 49/95 |
| Catalyst Ge Amount, ppm | ND/ND | ND/ND | ND/ND |
| AA Amount in Material, ppm | 8.1/8.9 | 7.5/8.1 | 82.1/7.6 |
| Falling Strength, % | 0 | 0 | 80 |
| ESCR of Bottom Portion, hours | >240 | >240 | 192 |
| Post Shrinkage, % | 2.2 | 1.3 | 6.9 |
| Remarks | no trouble | no trouble | because of high injection pressure insufficient below often occured |

EXAMPLE 5

Bottles as described in Example 4 were formed from the polyethylene terephthalate described in Example 4 by using the injection/biaxial draw-blow-forming machine.

The shape of the portion adjacent to the gate of the injection zone was of type B described in Example 4.

In this example, the test was carried to mainly by changing the injection resin temperature as follows.

Condition 1
(1) Set Temperature of Barrel: 260° C. (rear portion), 285° C. (intermediate portion), 300° C. (front portion), 300° C. (nozzle portion)
(2) Resin Temperature: 318° C.

Condition 2
(1) Set Temperature of Barrel: 250° C. (rear portion), 255° C. (intermediate portion), 255° C. (front portion), 255° C. (nozzle portion)
(2) Resin Temperature: 258° C.

Condition 3
(1) Set Temperature of Barrel: 300° C. (rear portion), 340° C. (intermediate portion), 345° C. (front portion), 345° C. (nozzle portion)
(2) Resin Temperature: 359° C.

When the test was conducted under Condition 1 and Condition 3, the rotation number of the screw of the injection machine was 150 rpm, the injection pressure was 180 kg/cm² and 160 kg/cm², respectively, and the molding cycle was 22 seconds and 25 seconds, respectively.

When the test was conducted under Condition 2, if the rotation number of the screw was 150 rpm, the injection pressure was abnormally increased to 390 kg/cm². Accordingly, the rotation number of the screw was lowered to 100 rpm. However, insufficient blow often occurred and the thickness unevenness was great in the formed bottle, and it was judged that the bottle had no practical utility. Therefore, the test was stopped.

Incidentally, the temperature of cooling water for the entire mold was 15° C.

The bottle formed under Condition 1 was designated as bottle 51BB and the bottle formed under Condition 3 was designated as bottle 52BB.

The so-obtained two bottles were subjected to the differential thermal analysis according to he above-mentioned method. The peak temperatures of each sample are shown in Table 8. The data of bottle N4BB obtained in Example 4 are also shown in Table 8.

The heat quantity ($Q_{AC}$) of crystallization at elevation of the temperature, the melting heat quantity ($Q_M$) and the heat quantity ($Q_{DC}$) of crystallization at lowering of the temperature, determined with respect to the bottom portion of each of bottles N4BB, 51BB and 52BB according to the above-mentioned method, and the thermal crystallization degree ratio (V) calculated from these heat quantities are shown in Table 9.

With respect to each of bottles 51BB and 52BB, the bottom portion of the bottle and the side wall portion of the bottle for the comparison were subjected to the atomic absorption spectroscopy. The data obtained with respect to bottles 51BB and 52BB and the data of bottle N4BB (shown in Table 7) are shown in Table 9. Incidentally, each indication has the same meaning as in Example 2.

With respect to each of the obtained two bottles, the acetaldehyde amounts (AA amounts) in the bottom portion and the side wall portion for the comparison (the manner of indication in the column of the AA amount was the same as in Example 2), the falling strength, the environmental stress crack resistance (ESCR of the bottom portion) and the post shrinkage were determined according to the above-mentioned methods. The obtained results are shown in Table 9. The data of bottle N4BB described in Example 4 are also shown in Table 9 for reference.

EXAMPLE 6

A three-layer bottle comprising inner and outer layers composed of the polyethylene terephthalate and an intermediate layer composed of an ethylene/vinyl alcohol copolymer (ethylene content=34 mole %, saponification degree=99%) was formed according to the process described in the specification of Japanese Patent Application No. 37439/85). The weight of the three-layer bottle was 59 g and the full inner volume was 1523 ml. This three-layer bottle was designated as bottle M61B.

A heat-resistant multi-layer bottle comprising inner and outer layers composed of the polyethylene terephthalate described in Example 1 and an intermediate layer composed of poly-m-xylylene adipamide (nylon MXD6 having a relative viscosity of 2.24) was formed according to the method described in the specification of Japanese Patent Application No. 41952/86. The weight of the heat-resistant multi-layer bottle was 59 g and the full inner volume was 1511 ml. This heat-resistant multi-layer bottle was designated as bottle M62B.

With respect to each of the prepared two multi-layer bottles, the outer layer was peeled from the bottom portion and this outer layer was subjected to the differential thermal analysis according to the above-mentioned method. The peak temperatures of each sample are shown in Table 10.

With respect to each of bottles M61B and M62B, the heat quantity ($Q_{AC}$) of crystallization at elevation of the temperature, the melting heat quantity ($Q_M$) and the heat quantity ($Q_{DC}$) of crystallization at lowering of the temperature of the outer layer and the thermal crystallization degree ratio (V) calculated from these heat quantities are shown in Table 11.

With respect to the outer layer of each of the so-obtained two bottles, the bottom portion and the side wall portion for the comparison were subjected to the atomic absorption spectroscopy according to the above-mentioned method. The obtained results are shown in Table 11. Incidentally, the manner of indication in the column of the catalyst amount in Table 11 is the same as in Example 2.

With respect to each of the so-obtained bottles M61B and M62B, the acetaldehyde amounts (AA amounts in the material) in the bottom portion and the side wall portion for the comparison (the indication has the same meaning as in Example 2), the falling strength, the environmental stress crack resistance (ESCR of the bottom

TABLE 8

| Sample | Tg (°C.) | Tac1 (°C.) | Tac2 (°C.) | Tm (°C.) | Tdc1 (°C.) | Tdc2 (°C.) | Resin Temperature |
|---|---|---|---|---|---|---|---|
| N4BB | 84 | *131 | 141 | 253 | *209 | 191 | 300° C. |
| 51BB | 83 | *131 | 143 | 253 | *207 | 189 | 318° C. |
| 51BB | *86 | 140 | 140 | 254 | 194 | 194 | 359° C. |

Note
Each indication has the same meaning as in the Note of Table 1.

TABLE 9

| Bottle | N4BB | 51BB | 52BB |
|---|---|---|---|
| Weight of Bottle Portion by DSC, mg | 14.3 | 14.8 | 14.8 |
| Heat Quantity of Crystallization at Elevation of Temperature | 0.20 | 0.18 | 0.03 |
| Melting Heat Quantity | 0.26 | 0.28 | 0.33 |
| Heat Quantity of crystallization at Lowering of Temperature | 0.26 | 0.27 | 0.27 |
| Thermal Crystallization Ratio | 23.7 | 33.1 | 90.1 |
| Catalyst Ti Amount, ppm | 80/102 | 97/88 | 106/75 |
| Catalyst P Amount, ppm | 84/54 | 79/63 | 51/92 |
| Catalyst Ge Amount, ppm | ND/ND | ND/ND | ND/ND |
| AA Amount in Material, ppm | 7.5/8.1 | 10.0/9.8 | 70.4/96 |
| Falling strength, % | 0 | 0 | 60 |
| ESCR of Bottom Portion, hours | >240 | >240 | 168 |
| Post Shrinkage, % | 1.3 | 1.5 | 6.5 |
| Remarks | no trouble | no trouble | formed bottle was slightly yellowed |

Note
Each indication has the same meaning as in the Note of Table 5.

portion) and the post shrinkage were determined. The obtained results are shown in Table 11.

TABLE 10

| Sample | Tg (°C.) | Tac1 (°C.) | Tac2 (°C.) | Tm (°C.) | Tdc1 (°C.) | Tdc2 (°C.) |
|---|---|---|---|---|---|---|
| M61B | 82 | 132 | *144 | 255 | 190 | 190 |
| M62B | 83 | 133 | *142 | 255 | *209 | 188 |

Note
Each indication has the same meaning as in the Note of Example 1.

TABLE 11

| Bottle | M61B | M62B |
|---|---|---|
| Weight of Bottom Portion by DSC, mg | 14.5 | 14.3 |
| Heat Quantity of Crystallization at Elevation of Temperature | 0.11 | 0.11 |
| Melting Heat Quantity | 0.27 | 0.26 |
| Heat Quantity of Crystallization at Lowering of Temperature | 0.26 | 0.25 |
| Thermal Crystallization Degree Ratio | 59.0 | 56.0 |
| Catalyst Ge Amount, ppm | 57/44 | 54/48 |
| Catalyst P Amount, ppm | 96/23 | 94/26 |
| Catalyst Ti Amount, ppm | ND/ND | ND/ND |
| AA Amount in Material, ppm | 4.7/7.1 | 3.9/5.0 |
| Falling Strength, % | 0 | 0 |
| ESCR of Bottom Portion, hours | >240 | >240 |
| Post Shrinkage, % | 1.6 | 0.9 |
| Remarks | no trouble | no trouble |

Note
Each indication has the same meaning as in the Note of Table 5.

EXAMPLE 7

A five-layer pipe comprising inner and outer layers composed of polyethylene terephthalate (IV=1.09 dl/g, DEG=0.07% by weight; by the EPMA method, it was confirmed that germanium (Ge) and phosphorus (P) were contained as the catalyst metal elements), an intermediate layer composed of an ethylene/vinyl alcohol copolymer (ethylene content=31 mole %, saponification degree=99.5%) and adhesive layers of 6.66 copolymer nylon (relative viscosity=2.65, caprolactum concentration=78% by weight interposed between the inner layer and intermediate layer and between the outer layer and intermediate layer was formed according to the co-extrusion method disclosed in the specification of Japanese Patent Application No. 174038/84. Then, as described in the above-mentioned specification, the pipe was cut into a predetermined length, a neck was formed and a bottom portion prepared separately was attached by heat fusion bonding to obtain a bottomed preform.

When the bottom portion was attached to the cut pipe, the temperature of the bottom-cooling mold was adjusted to (i) 20° C. (the obtained bottomed preform was designated as "preform A") or (ii) 190° C. (the obtained bottomed preform was designated as "preform B").

These two 5-layer bottoms preforms were formed in cylindrical multi-layer bottles having a full inner volume of about 1035 ml and a weight of 37 g by using a biaxial draw-blow-forming machine (Model OBM-1B supplied by Toyo Shokuhin Kikai). The molding conditions were such that the preform was heated at 100° C. for 47 seconds and blow forming was carried out in the mold for 8 seconds.

The five-layer bottle formed from preform A was designated as bottle L7AB and the five-layer bottle formed from preform B was designated as bottle L7BB.

The outer layers were peeled from the bottom portions of the so-obtained multi-layer bottles and subjected to the differential thermal analysis according to the above-mentioned method. The peak temperatures of each sample are shown in Table 12.

With respect to each of the outer layers of the bottom portions of bottles L7AB and L7BB, the heat quantity ($Q_{AC}$) of crystallization at elevation of the temperature, the melting heat quantity ($Q_M$) and the heat quantity ($Q_{DC}$) of crystallization at lowering of the temperature, and the thermal crystallization degree ratio (V) calculated from these heat quantities, are shown in Table 13.

With respect to each of the outer layers of the so-obtained two bottles, the bottom portion of the bottle and the side wall portion of the bottle for the comparison were subjected to the atomic absorption spectroscopy according to the above-mentioned method. The obtained results are shown in Table 13. Incidentally, each indication in the column of the catalyst amount in Table 13 has the same meaning as in Example 2.

With respect to each of bottles L7AB and L7BB, the acetaldehyde amounts (AA amounts) of the bottom portion and the side wall portion for the comparison (the manner of indication in the column of the AA amount is the same as in Example 2), the falling strength, the environmental stress crack resistance (ESCR of the bottom portion) and the thermal shrinkage were determined according to the above-mentioned methods. The obtained results are shown in Table 13.

TABLE 12

| Sample | Tg (°C.) | Tac1 (°C.) | Tac2 (°C.) | Tm (°C.) | Tdc1 (°C.) | Tdc2 (°C.) |
|---|---|---|---|---|---|---|
| L7AB | 84 | 134 | 134 | 256 | 185 | 185 |
| L7BB | *87 | 138 | 138 | 257 | 195 | 195 |

Note
Each indication has the same meaning as in the Note in Table 1.

TABLE 13

| Bottle | L7AB | L7BB |
|---|---|---|
| Weight of Bottom Portion by DSC, mg | 14.6 | 14.4 |
| Heat Quantity of Crystallization at Elevation of Temperature | 0.14 | 0.02 |
| Melting Heat Quantity | 0.27 | 0.32 |
| Heat Quantity of Crystallization at Lowering of Temperature | 0.27 | 0.27 |
| Thermal Crystallization Degree Ratio | 46.3 | 91.8 |
| Catalyst Ge Amount, ppm | 75/64 | 99/40 |
| Catalyst P Amount, ppm | 73/68 | 39/101 |
| Catalyst Ti Amount, ppm | ND/ND | ND/ND |
| AA Amount in Material, ppm | 3.1/2.5 | 46.1/2.9 |
| Falling Strength, % | 0 | 90 |
| ESCR of Bottom Portion, hours | >240 | 120 |
| Post Shrinkage, % | 1.2 | 5.5 |
| Remarks | no trouble | bottom portion of bottle was extremely |

TABLE 13-continued

| Bottle | L7AB | L7BB |
|---|---|---|
| | | whitened |

Note
Each indication has the same meaning as in the Note of Table 5.

EXAMPLE 8

Polyethylene terephthalate containing 350 ppm of manganese (Mn), 50 ppm of germanium (Ge), 270 ppm of antimony, 20 ppm of cobalt (Co) and 100 ppm of phosphorus (P) as the catalyst metal elements as determined by the above-mentioned EPMA method and atomic absorption spectroscopy (IV=1.22, DEG=3.4% by weight) was formed into a sheet having a width of 450 mm and a thickness of 0.8 mm by using an extrusion molding machine provided with a full-flight screw having a diameter of 65 mm and an effective length of 1300 mm and a T-dye having a lip width of 500 mm. The set temperatures of the extruder were 255° C. in the feed zone, 270° C. in the compression zone, 280° C. in the metering zone and 285° C. in the die zone, and the rotation number of the screw was 40 rpm.

The obtained sheet was formed into a tray having a length of 125 mm, a width of 125 mm and a depth of 25 mm at a mold temperature of 170° C. by using a plug-assist vacuum air-pressure forming machine manufactured by way of a trial, in which the mold temperature could be elevated to 170° C. This tray was designated as tray R81T.

Separately, 10 g of germanium dioxide $GeO_2$ and 50 g of antimony trioxide $Sb_2O_3$ were added to 50 kg of the above-mentioned polyethylene terephthalate, and a sheet having the same shape as described above was formed by using the above-mentioned extrusion molding machine under the same molding conditions as described above. Then, the sheet was formed into a square tray having the above-mentioned shape under the same conditions as described above by using the vacuum air-pressure forming machine as described above. The obtained tray was designated as tray R82T.

These two trays were subjected to the differential thermal analysis of the bottom portion according to the above-mentioned method. The peak temperatures of each sample are shown in Table 14.

The heat quantity ($Q_{AC}$) of crystallization at elevation of the temperature, the melting heat quantity ($Q_M$) and the heat quantity ($Q_{DC}$) of crystallization at lowering of the temperature, determined with respect to each sample, and the thermal crystallization degree ratio (V) calculated from these heat quantities, are shown in Table 15.

With respect to each of these two stray samples, the bottom portion of the tray and the side wall portion of the tray for the comparison were subjected to the atomic absorption spectroscopy. The obtained results are shown in Table 15. Each indication in the column of the catalyst amount in Table 15 has the same meaning as in Example 2.

Moreover, with respect to each of the two trays, the acetaldehyde amounts (AA amounts in the material) in the bottom portion and the side wall portion for the comparison (each indication in the column of the AA amount in Table 15 has the same meaning as in Example 2), the falling strength and the post shrinkage were determined. The obtained results are shown in Table 15.

TABLE 14

| Sample | Tg (°C.) | Tac1 (°C.) | Tac2 (°C.) | Tm (°C.) | Tdc1 (°C.) | Tdc2 (°C.) |
|---|---|---|---|---|---|---|
| R81T | 86 | 139 | 139 | 255 | 193 | 193 |
| R82T | *88 | 139 | 139 | 256 | 198 | 198 |

Note
Each indication has the same meaning as in the Note of Table 1.

TABLE 15

| Tray | R81T | R82T |
|---|---|---|
| Weight of Bottom Portion by DSC, mg | 14.8 | 14.7 |
| Heat Quantity of Crystallization at Elevation of Temperature | 0.05 | 0.02 |
| Melting Heat Quantity | 0.29 | 0.34 |
| Heat Quantity of Crystallization at lowering of Temperature | 0.26 | 0.28 |
| Thermal Crystallization Degree Ratio | 79.2 | 91.7 |
| Catalyst Mn Amount, ppm | 370/331 | 376/329 |
| Catalyst Ge Amount, ppm | 55/46 | 209/173 |
| Catalyst Sb Amount, ppm | 288/255 | 1205/1005 |
| Catalyst Co Amount, ppm | 24/18 | 26/16 |
| Catlayst P Amount, ppm | 101/93 | 47/146 |
| AA Amount in Material, ppm | 9.4/8.1 | 60.5/17.7 |
| Falling Strength, % | 20 | 100 |
| Post Shrinkage, % | 2.2 | 2.2 |
| Remarks | tray had gloss on surface | tray was brittle |

Note
Each indication has the same meaning as in the Note in Table 5.

We claim:

1. In a polyester vessel having mouth, side wall and bottom portions formed of a polyester composed mainly of ethylene terephthalate units, the improvement wherein said polyester is a thermoplastic polyester containing (i) a catalyst residue comprising Ge or Ti in an amount smaller than 1000 ppm as the metal and (ii) a phosphoric acid type stabilizer in an amount larger than 15 ppm as P in the case of the Ge-catalyst or in an amount larger than 55 ppm as P in the case of the Ti-catalyst, the upper limit of the amount of the phosphoric acid type stabilizer being smaller than 500 ppm as P, and in the thermoplastic polyester constituting the bottom portion of the vessel, the ratio of the thermal crystallization degree (V) represented by the following formula:

$$V = 100 \times (Q_{DC} - Q_{AC})/Q_{DC} \qquad (1)$$

wherein $Q_{AC}$ stands for the heat quantity of crystallization at elevation of the temperature and $Q_{DC}$ stands for the heat quantity of crystallization at lowering of the temperature, is lower than 90%.

2. A vessel as set forth in claim 1, wherein the ratio of the thermal crystallization ratio is lower than 85%.

3. A vessel as set forth in claim 1, wherein the ratio of the thermal crystallization degree is lower than 50%.

4. A vessel as set forth in claim 1, wherein the amount of the catalyst residue is smaller than 900 ppm as the metal.

5. A vessel as set forth in claim 1, wherein the polyester is a polyester composed mainly of ethylene terephthalate units, which has an intrinsic viscosity (IV) of 0.55 to 1.40 dl/g and a diethylene glycol unit content of 0.01 to 5.0% by weight.

6. A vessel as set forth in claim 1, wherein at least the side wall portion of the vessel is molecularly oriented in both the axial direction of the vessel and the circumferential direction of the vessel.

7. In a polyester package comprising a polyester vessel having mouth, side wall and bottom portions formed of a thermoplastic polyester composed mainly of ethylene terephthalate units and an edible oil filled and sealed in the polyester vessel, the improvement wherein said polyester is a thermoplastic polyester containing (i) a catalyst residue comprising Ge or Ti in an amount smaller than 1000 ppm as the metal and (ii) a phosphoric acid type stabilizer in an amount larger than 15 ppm as P in the case of the Ge-catalyst or in an amount larger than 55 ppm as P in the case of the Ti-catalyst, the upper limit of the amount of the phosphoric acid type stabilizer being smaller than 500 ppm as P, and in the thermoplastic polyester constituting the bottom portion of the vessel, the ratio of the thermal crystallization degree (V) represented by the following formula:

$$V = 100 \times (Q_{DC} - Q_{AC})/Q_{DC} \qquad (1)$$

wherein $Q_{AC}$ stands for the heat quantity of crystallization at elevation of the temperature and $Q_{DC}$ stands for the heat quantity of crystallization at lowering of the temperature, is lower than 90%.

8. A vessel as set forth in claim 5, wherein the polyester has an intrinsic viscosity (IV) of 0.65 to 1.25 dl/g and a diethylene glycol unit content of 0.05 to 3.5% by weight.

9. A vessel as set forth in claim 6, wherein the draw ratio in the axial direction of the vessel is 1.1 to 3.0 and the draw ratio in the circumferential direction of the vessel is 3.0 to 5.0.

10. In a polyester vessel having mouth, side wall and bottom portions formed of a polyester composed mainly of ethylene terephthalate units, the improvement wherein said polyester is a thermoplastic polyester containing (i) a catalyst residue comprising Ge, Ti or Sb in an amount smaller than 1000 ppm as the metal and (ii) a phosphoric acid type stabilizer in an amount larger than 15 ppm as P in case of the Ge-catalyst, in an amount larger than 55 ppm as P in the case of the Ti-catalyst, or in an amount larger than 95 ppm as P in the case of the Sb-catalyst, the upper limit of the amount of the phosphoric acid type stabilizer being smaller than 500 ppm as P; in the thermoplastic polyester constituting the bottom portion of the vessel, the ratio of the thermal crystallization degree (V) represented by the following formula:

$$V = 100 \times (Q_{DC} - Q_{AC})/Q_{DC} \qquad (1)$$

wherein $Q_{AC}$ stands for the heat quantity of crystallization at elevation of the temperature and $Q_{DC}$ stands for the heat quantity of crystallization at lowering of the temperature, is lower than 90%; and the bottom portion has a higher concentration of the phosphoric acid type stabilizer than the phosphoric acid type stabilizer concentration in the side wall portion.

* * * * *